US008574416B2

(12) United States Patent
Hayashi et al.

(10) Patent No.: US 8,574,416 B2
(45) Date of Patent: Nov. 5, 2013

(54) METHOD FOR PRODUCING EXHAUST PIPE

(75) Inventors: Kotaro Hayashi, Ibi-gun (JP); Takumi Domae, Ibi-gun (JP); Kenzo Saiki, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 106 days.

(21) Appl. No.: 13/421,802

(22) Filed: Mar. 15, 2012

(65) Prior Publication Data

US 2012/0234685 A1 Sep. 20, 2012

(30) Foreign Application Priority Data

Mar. 16, 2011 (JP) ................................ 2011-057966

(51) Int. Cl.
*C25D 15/00* (2006.01)

(52) U.S. Cl.
USPC ............................ 204/509; 204/491; 204/493

(58) Field of Classification Search
USPC ......................................... 204/491, 493, 509
See application file for complete search history.

(56) References Cited

U.S. PATENT DOCUMENTS

| | | | | |
|---|---|---|---|---|
| 8,247,067 | B2 * | 8/2012 | Cavallin | 428/325 |
| 2006/0086077 | A1 | 4/2006 | Skoog et al. | |

FOREIGN PATENT DOCUMENTS

| | | |
|---|---|---|
| EP | 1411093 | 4/2004 |
| EP | 2210919 | 7/2010 |
| EP | 2210920 | 7/2010 |
| JP | 2009-133213 | 6/2009 |
| JP | 2009-133214 | 6/2009 |

OTHER PUBLICATIONS

Database WPI Week 200313 Thomson Scientific, London, GB; AN 2003-132503 XP002675960.

* cited by examiner

*Primary Examiner* — Kishor Mayekar
(74) *Attorney, Agent, or Firm* — Ditthavong Mori & Steiner, P.C.

(57) ABSTRACT

A method for producing an exhaust pipe includes electrocoating a surface of a metal base material with a paint to form a coat film. The paint includes inorganic glass particles and an electrocoating resin. The coat film is heated to a first temperature that is not lower than a burning-out temperature of the electrocoating resin. The coat film is heated, after heating the coat film to the first temperature, to a second temperature that is not lower than a softening point of the inorganic glass particles to produce the exhaust pipe which includes the metal base material and a surface coating layer formed on the surface of the metal base material.

19 Claims, 7 Drawing Sheets

METHOD FOR PRODUCING EXHAUST PIPE

CROSS-REFERENCE TO RELATED APPLICATIONS

The present application claims priority under 35 U.S.C. §119 to Japanese Application 2011-057966, filed on Mar. 16, 2011, the contents of which are incorporated herein by reference in their entirety.

BACKGROUND OF THE INVENTION

1. Field of the Invention

The present invention relates to a method for producing an exhaust pipe.

2. Discussion of the Background

In order to treat injurious substances such as injurious gases contained in an exhaust gas discharged from an engine, a catalyst converter is installed in an exhaust gas passage including an exhaust pipe.

In order to improve a purifying efficiency for injurious substances by the catalyst converter, it is necessary to maintain the temperature of an exhaust gas and the temperature of the exhaust pipe and the like through which the exhaust gas is allowed to flow at temperatures suitable for activating the catalyst (hereinafter, referred to also as a catalyst activating temperature).

However, at the time of high-rate driving of the engine, the exhaust gas temporarily has such a high temperature as to exceed 1000° C. Therefore, the temperature of the exhaust gas sometimes becomes higher than the upper limit value of the catalyst activating temperature. As a result, problems are raised in that it becomes difficult to efficiently purify an exhaust gas and in that the catalyst deteriorates.

For this reason, an exhaust pipe to be connected to an automobile engine needs to be capable of externally radiating heat of the exhaust gas that flows through the exhaust pipe at the time of high-rate driving of the automobile engine.

JP 2009-133213 A and JP 2009-133214 A have disclosed an exhaust pipe having a structure in which a layer composed of a crystalline inorganic material and an amorphous inorganic material is formed on a surface of a cylindrical base material made of metal.

JP 2009-133213 A has disclosed an exhaust pipe having a structure in which the layer composed of a crystalline inorganic material and an amorphous inorganic material has infrared-ray emissivity higher than the infrared-ray emissivity of the base material so that it is superior in heat releasing characteristic.

Moreover, JP 2009-133214 A has disclosed an exhaust pipe having a structure in which the amorphous inorganic material located on the outer circumferential side from the crystalline inorganic material has an average thickness of 20 μm or less so that it is superior in heat releasing characteristic.

The contents of JP-A 2009-133213 and JP-A 2009-133214 are incorporated herein by reference in their entirety.

SUMMARY OF THE INVENTION

According to one aspect of the present invention, a method for producing an exhaust pipe includes electrocoating a surface of a metal base material with a paint to form a coat film. The paint includes inorganic glass particles and an electrocoating resin. The coat film is heated to a first temperature that is not lower than a burning-out temperature of the electrocoating resin. The coat film is heated, after heating the coat film to the first temperature, to a second temperature that is not lower than a softening point of the inorganic glass particles to produce the exhaust pipe which includes the metal base material and a surface coating layer formed on the surface of the metal base material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENT

Figure 1A:
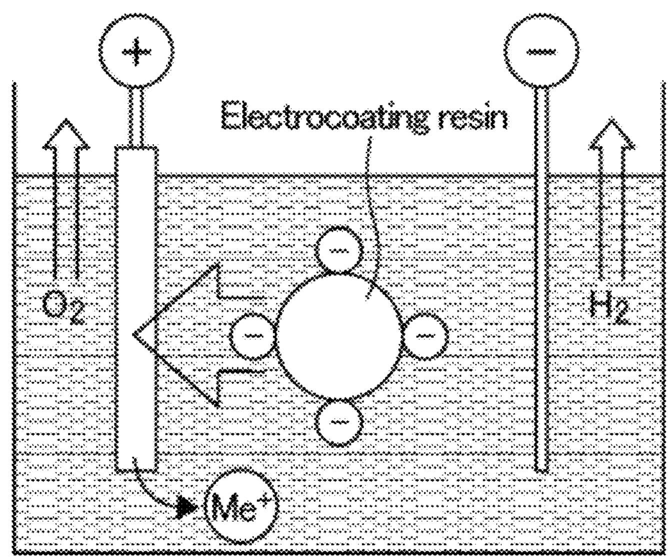
FIG. 1A is an explanatory drawing that schematically illustrates an anionic electrocoating process in the embodiment of the present invention.

The embodiments will now be described with reference to the accompanying drawings, wherein like reference numerals designate corresponding or identical elements throughout the various drawings.

In accordance with the inventions disclosed in JP 2009-133213 A and JP 2009-133214 A, it has become possible to provide an exhaust pipe that is superior in heat releasing characteristic. However, there have been still strong demands for an exhaust pipe that is further superior in heat releasing characteristic, and in particular, the development of an exhaust pipe that is by far superior in heat releasing characteristic.

That is, the method for producing an exhaust pipe according to an embodiment of the present invention is a method for producing an exhaust pipe provided with a metal base material and a surface coating layer formed on a surface of the metal base material, including: a coatfilm forming step of forming a coat film on a surface of the metal base material by carrying out an electrocoating process using a paint containing inorganic glass particles and an electrocoating resin; and a heating step of heating, after the coatfilm forming step, the coat film to temperature that is not less than the burning-out temperature of the electrocoating resin, and further heating the coat film to temperature that is not less than the softening point of the inorganic glass particles.

In the method for producing an exhaust pipe according to the embodiment of the present invention, in the coatfilm forming step, a coat film is formed on a surface of a metal base material by carrying out an electrocoating process using a paint containing an electrocoating resin. Thereafter, in the heating step, the coat film is heated to temperature that is not less than the burning-out temperature of the electrocoating resin, and the coat film is then further heated to temperature that is not less than the softening point of inorganic glass particles. As a result, a surface coating layer having concave portions formed on its surface is likely to be formed.

Figure 1B:
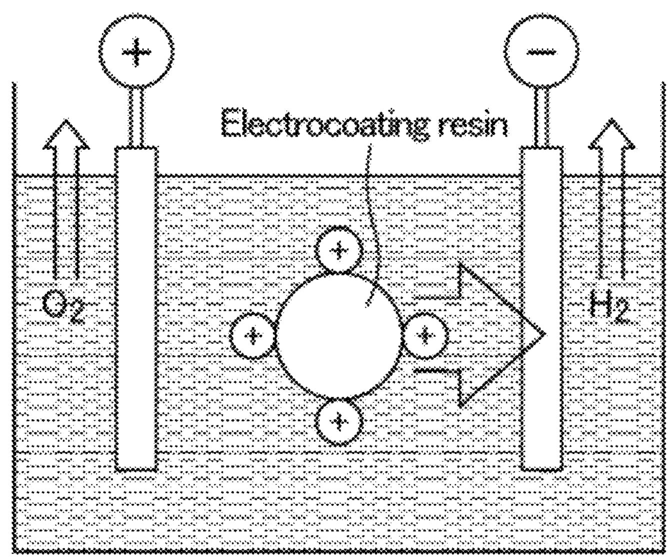
FIG. 1B is an explanatory drawing that schematically illustrates a cationic electrocoating process in the present invention.

Referring to FIG. 1A to FIG. 1B as well as FIG. 2A to FIG. 2E, a description will be given.

FIG. 1A is an explanatory drawing that schematically illustrates the process of anionic electrocoating according to the embodiment of the present invention.

FIG. 1B is an explanatory drawing that schematically illustrates the process of cationic electrocoating according to the embodiment of the present invention.

Figure 2A:
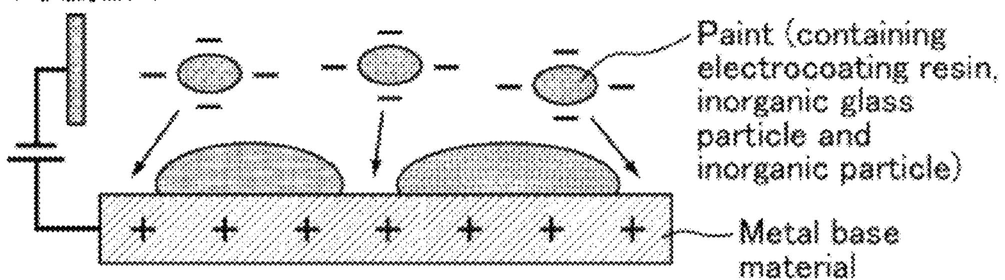
FIG. 2A to FIG. 2C are explanatory drawings that schematically illustrate one example of a phenomenon that takes place during a coatfilm forming step in the embodiment of the present invention.
Figure 2B:
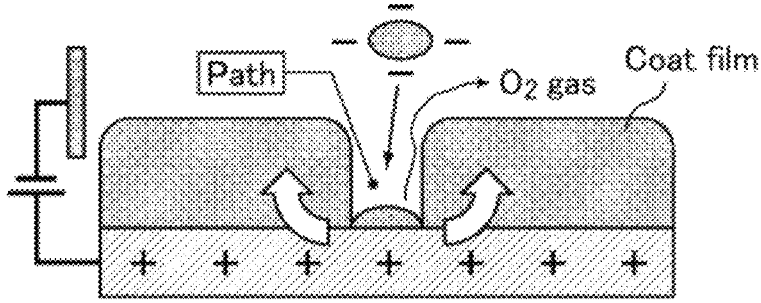
Figure 2C:
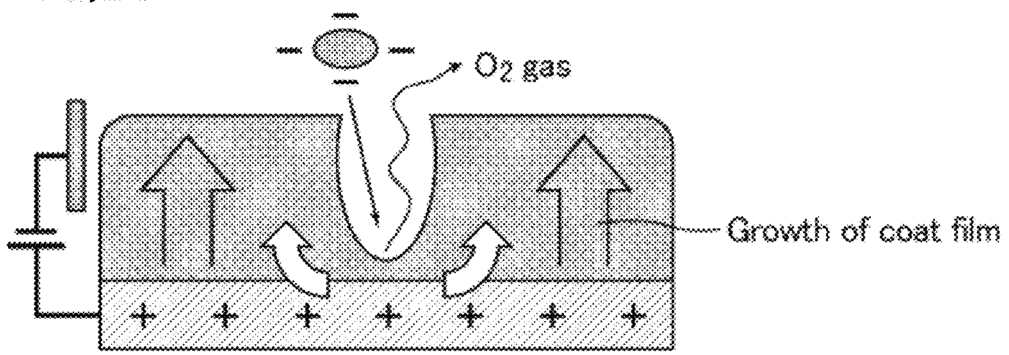
Figure 2D:
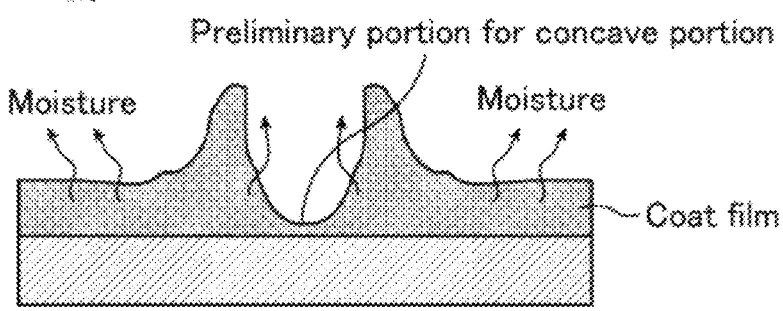
FIG. 2D and FIG. 2E are explanatory drawings that schematically illustrate one example of a phenomenon that takes place during a heating step in the embodiment of the present invention.
Figure 2E:
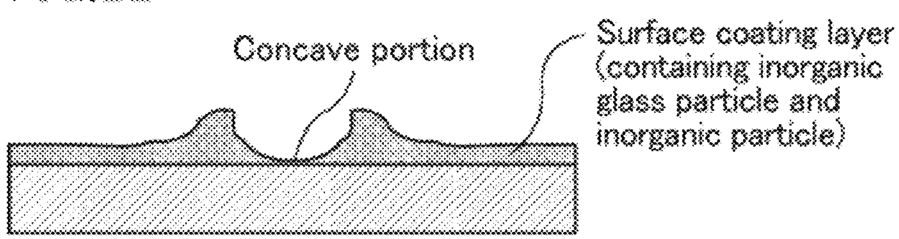

FIG. 2A to FIG. 2C are explanatory drawings that schematically illustrate one example of a phenomenon that takes place during a coatfilm forming step according to the embodiment of the present invention. FIG. 2D and FIG. 2E are explanatory drawings that schematically illustrate one example of a phenomenon that takes place during a heating step according to the embodiment of the present invention.

As shown in FIG. 1A and FIG. 1B, the electrocoating process according to the embodiment of the present invention includes an anionic electrocoating process and a cationic electrocoating process.

Additionally, in the example shown in FIG. 2A to FIG. 2E, it is supposed that an anionic electrocoating resin is used as the electrocoating resin; however, a cationic electrocoating resin can also be used as the electrocoating resin. Moreover, it is supposed that a paint and a surface coating layer contain inorganic particles; however, inorganic particles are not necessarily required to be contained.

In the anionic electrocoating process, an anionic electrocoating resin is used as the electrocoating resin.

The anionic electrocoating resin has a functional group (for example, carboxyl group) that reacts with a base to form a salt so that by being neutralized with a base (for example, organic amine), it is negatively charged (see the following formula (1)):

$$R\text{—}COOH+NR_3 \rightarrow R\text{—}COO^-+NR_3H^+ \quad (1)$$

When a metal base material and an electrode plate are disposed in an electrocoating vessel, with a current being applied thereto, the electrocoating resin negatively charged is attracted toward the anode (see FIG. 1A) so that inorganic glass particles and the like contained in a paint are carried onto the surface of the metal base material (object to be coated) together with the electrocoating resin. When the electrocoating resin is brought into contact with the surface of the metal base material, the following reactions (2) and (3) proceed:

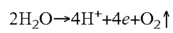

$$2H_2O \rightarrow 4H^++4e+O_2\uparrow \quad (2)$$

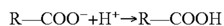

$$R\text{—}COO^-+H^+ \rightarrow R\text{—}COOH$$

Consequently, since the electrocoating resin is changed to be insoluble, the inorganic glass particles and the like are deposited on the surface of the metal base material (anode).

In contrast, in the cationic electrocoating process, a cationic electrocoating resin is used as the electrocoating resin.

Since the cationic electrocoating resin is positively charged, and attracted toward the cathode (see FIG. 1B), the inorganic glass particles and the like are deposited on the surface of the metal base material (cathode).

As described above, in the electrocoating process according to the embodiment of the present invention, the electrocoating resin carries the inorganic glass particles and the like onto the surface of the metal base material (see FIG. 2A). Then, the electrocoating resin is brought into contact with the surface of the metal base material, and deposited on the surface of the metal base material (see FIG. 2B and FIG. 2C). At this time, paths through which the soluble electrocoating resin is allowed to pass are formed in the coat film (see FIG. 2B and FIG. 2C). As shown in the reaction formula of (2), when the electrocoating resin is brought into contact with the surface of the metal base material, an oxygen gas is generated. These paths are formed when the oxygen gas thrusts the coat film that has already been formed aside to proceed into the coating solution. In the case where the electrocoating resin remains inside the paths after the electrocoating process, since the electrocoating resin is not deposited on the surface of the metal base material and in a soluble state, the resin is dropped off by washing with water.

Thereafter, when the coat film is heated, the electrocoating resin is burned out so that the volume of the coat film is contracted. It is considered that during this period, the concave portions are likely to be formed in accordance with the paths (see FIG. 2D and FIG. 2E).

Moreover, in the heating step, since the coat film is heated to temperature that is not less than the softening point of the inorganic glass particles, the inorganic glass particles are fused. Therefore, it is considered that a reduction rate in film thickness of the coat film becomes great so that surface coating layers having concave portions are more easily formed.

In this manner, since the exhaust pipe produced through the above-mentioned steps tends to have concave portions formed on the surface of surface coating layer, the surface area of the exhaust pipe becomes great to allow the exhaust pipe to be likely to have high apparent emissivity. For this reason, by accelerating the radiant heat transfer, the resultant exhaust pipe tends to have a superior heat releasing characteristic.

Moreover, by the concave portions formed on the surface of the surface coating layer, it is easy to set many non-fixed ends for use in dispersing thermal stress. Furthermore, by the concave portions formed on the surface of the surface coating layer, portions having thinner film thicknesses are formed in the surface coating layer, and since a temperature difference in each of these portions becomes small in the thickness direction, thermal stress hardly occurs inside the surface coating layer. Therefore, the thermal stress due to thermal impact is likely to be alleviated so that the surface coating layer is likely to be prevented from having separation. It is considered that, as a result, the exhaust pipe obtained according to the embodiment of the present invention tends to maintain a high heat releasing characteristic.

In this manner, in accordance with the method for producing an exhaust pipe according to the embodiment of the present invention, the concave portions are likely to be formed on the surface of the surface coating layer efficiently, thereby making it easier to obtain an exhaust pipe having a superior heat releasing characteristic.

Moreover, since the inorganic glass particles are fused and then sintered in the heating step, adhesion between the surface coating layer and the metal base material is likely to be improved. Consequently, the thermal impact resistant property of the exhaust pipe tends to be improved.

In the present specification, the surface coating layer is a layer formed on the surface of a metal base material, which is obtained by subjecting the coat film to a firing treatment (to be described later). Of the layers formed on the surface of the metal base material, a layer prior to being subjected to the firing treatment is referred to as a coat film, and a layer after having been subjected to the firing treatment is referred to as a surface coating layer. The exhaust pipe is constituted by the metal base material and the surface coating layer.

In the method for producing an exhaust pipe according to the embodiment of the present invention, the heating step preferably includes a degreasing step in which after the coat-film forming step, the coat film is maintained at temperature that is not less than the burning-out temperature of the electrocoating resin for a predetermined period of time to burn out the electrocoating resin, and a firing step in which, after the degreasing step, the coat film is heated to temperature that is not less than the softening point of the inorganic glass particles.

In this manner, by carrying out the degreasing step between the coatfilm forming step and the firing step, the production of large concave portions in the surface coating layer due to bumping caused by a rapid heating process tends to be suppressed, and consequently concave portions having appropriate sizes are likely to be formed. An exhaust pipe having a large surface area is thus likely to be obtained.

In the method for producing an exhaust pipe according to the embodiment of the present invention, the temperature that is not less than the softening point of the inorganic glass particles is in a range from about 500° C. to about 1000° C.

In the method for producing an exhaust pipe according to the embodiment of the present invention, the temperature that is not less than the burning-out temperature of the electrocoating resin is preferably in a range from about 300° C. to about 600° C.

In the method for producing an exhaust pipe according to the embodiment of the present invention, the electrocoating resin is preferably composed of a plurality of kinds of electrocoating resins each having mutually different $T_g$.

It is considered that by the method for producing an exhaust pipe according to the embodiment of the present invention, the paint tends to be less vulnerable to influences from the temperature at the time of application thereof so that it becomes easier to carry out a stable coatfilm forming process, with a comparatively wide temperature range, and consequently to alleviate the temperature dependence of the paint at the time of the application thereof.

As a result, it is considered that an exhaust pipe having a surface coating layer with desired concave portions formed on the surface thereof is likely to be obtained.

In the method for producing an exhaust pipe according to the embodiment of the present invention, the electrocoating resin preferably has a $T_g$ of from about 5° C. to about 50° C.

In the case where the $T_g$ of the electrocoating resin is about 5° C. or higher, the viscosity as a coat film is not low, and the resin tends not to easily flow. Consequently, during the electrocoating process, when paths are once formed on the coat film, the paths are not likely to be filled with the coat film because the peripheral electrocoating resin tends not to be softened and tends not to flow. On the contrary, when the $T_g$ of the electrocoating resin is about 50° C. or lower, the electrocoating resin tends not to be too hard and tends not to be too difficult to flow at room temperature. As a result, desired paths tend to be formed on the coat film.

In accordance with the method for producing an exhaust pipe according to the embodiment of the present invention, since the $T_g$ of the electrocoating resin falls within the above-mentioned range, the flowability of the electrocoating resin is appropriately adjusted. With this arrangement, it is considered that paths are likely to be formed during the electrocoating process, with the result that it becomes easier to obtain an exhaust pipe in which desired concave portions are formed on the surface of the surface coating layer.

In the method for producing an exhaust pipe according to the embodiment of the present invention, the electrocoating resin is desirably an anionic electrocoating resin.

In order to easily form desired concave portions on the surface of the exhaust pipe, it is necessary to improve the stability of the paint, and also to suppress the precipitation of the particles. In the case where the stability of the paint is low and particles are remarkably precipitated, since a large amount of particles drop on the horizontal surface portion of the metal base material, the ratio of solid components becomes higher and the flowability of the coat film is inhibited so that desired concave portions are less likely to be formed.

In the method for producing an exhaust pipe according to the embodiment of the present invention, since an anionic electrocoating resin is used as the electrocoating resin, good compatibility is provided between the surface charge of the inorganic particles and the surface charge of the inorganic glass particles so that the anionic electrocoating resin functions to suppress the precipitation of the inorganic particles and the inorganic glass particles, and therefore the stability of the paint tends to be improved; thus, it becomes easier to preferably form the coat film.

As a result, it is considered that it becomes easier to obtain an exhaust pipe having desired concave portions formed on the surface of the surface coating layer.

In the method for producing an exhaust pipe according to the embodiment of the present invention, preferably the paint further includes inorganic particles.

Since the inorganic particles have high emissivity in their material physical properties, infrared rays are released strongly when heated. This is indicated by Stefan-Boltzmann law represented by the following expression (4):

$$q=\epsilon\sigma(T_1^4-T_2^4) \qquad (4)$$

(σ: Stefan-Boltzmann constant . . . $5.67\times10^{-8}$ [$W/m^2\cdot K^4$], q: heat flux [$W/m^2$], ϵ: emissivity, $T_1$: heating unit temperature [K], $T_2$: heat receiving unit temperature [K])

Therefore, it is considered that an exhaust pipe obtained by applying a paint containing inorganic particles thereto generates infrared rays emitted from the inorganic particles in the surface coating layer, and the emissivity of the surface coating layer becomes high so that an exhaust pipe having a superior heat releasing characteristic at high temperature is likely to be obtained.

Moreover, it is considered that since the flowability of the inorganic glass particles softened at the time of firing is lowered, the flowing of the coat film on the periphery of the concave portions tends to be suppressed. Thus, it becomes possible to easily form the concave portions on the surface of the surface coating layer.

As described above, it is considered that an exhaust pipe that is further superior in heat releasing characteristic is likely to be obtained.

In the method for producing an exhaust pipe according to the embodiment of the present invention, the inorganic glass particles preferably have an average particle diameter of about 3 μm or less.

In the method for producing an exhaust pipe according to the embodiment of the present invention, the inorganic particles preferably have an average particle diameter of about 3 μm or less and the inorganic glass particles preferably have an average particle diameter of about 3 μm or less.

In the case where the average particle diameters of the inorganic glass particles and inorganic particles are small, since large particles are not likely to be contained, the sizes of the particles tend not to become ununiform. In this case, since the flow of the coat film is not likely to be locally disturbed during the electrocoating process, paths are likely to be formed, with the result that concave portions are likely to be formed on the surface of the exhaust pipe.

In contrast, in accordance with the method for producing an exhaust pipe according to the embodiment of the present invention, since the inorganic glass particles and the inorganic particles are small, the distribution of the inorganic glass particles and the inorganic particles tend to be made uniform. As a result, it is considered to be possible to easily form concave portions on the surface of the exhaust pipe.

Moreover, it is considered that in the case where the inorganic glass particles are small, since upon firing, the concave portions on the surface of the exhaust pipe are not likely to be filled with the softened inorganic glass particles so that concave portions are not likely to be hardly formed favorably on the surface of the exhaust pipe.

On the other hand, in the case where the inorganic particles are small as well, upon firing, solid-state inorganic particles are dispersed in the softened inorganic glass particles in a liquid state. At this time, it is considered that in the case where the inorganic particles are small, composite particles between the softened inorganic glass particles and the inorganic particles have high viscosity and low flowability in comparison with the case where the inorganic particles are large so that the composite particles tend not to fill in the concave portions on the surface of the exhaust pipe.

Moreover, it is considered that, since the average particle diameters of the inorganic glass particles and inorganic particles are small, upon carrying out the electrocoating process, the inorganic glass particles and the inorganic particles tend to be stabilized in a solution of the paint.

Particles in a paint solution are allowed to exist stably, when their particle diameters are small. This is indicated by Stokes' formula (5) shown below.

$$Vs = Dp^2(\rho p - \rho f)g/18\eta \quad (5)$$

(Vs: terminal rate of particle [m/s], Dp: particle diameter [m], ρp: density of particles [kg/m$^3$], ρf: density of fluid [kg/m$^3$], g: gravitational acceleration [m/s$^2$], η: viscosity of fluid [Pa·s])

Therefore, by using particles having a small particle diameter as the inorganic glass particles and the inorganic particles, the precipitation rate in a paint solution tends to be made small upon electrocoating, thereby making it easier to stabilize the inorganic glass particles and the inorganic particles in the paint solution.

It is considered that based upon the above reasons, an exhaust pipe having desirable concave portions formed on the surface of the surface coating layer tends to be obtained.

In the method for producing an exhaust pipe according to the embodiment of the present invention, the paint contains inorganic glass particles and an electrocoating resin, and the electrocoating resin preferably has a weight ratio of from about 1.0 to about 3.5 based on the weight of the inorganic glass particles.

Moreover, in the method for producing an exhaust pipe according to the embodiment of the present invention, the paint contains inorganic particles, inorganic glass particles and an electrocoating resin, and the electrocoating resin preferably has a weight ratio of from about 1.0 to about 3.5 based on the total weight of the inorganic particles and the inorganic glass particles.

When the amount of the electrocoating resin contained in the paint is not too large, the volume ratios of the inorganic particles and inorganic glass particles tend not to become too low, and the inorganic particles and the inorganic glass particles are not likely to be separated from one another within the coat film. Consequently, the inorganic particles and the inorganic glass particles tend to be combined with each other; therefore, upon degreasing the electrocoating resin, even when the electrocoating resin is heated and burned out, the inorganic particles and the inorganic glass particles tend not to collapse and drop off.

Additionally, the degreasing refers to a process for burning the electrocoating resin out by carrying out a heating process.

On the contrary, in the case where the amount of the electrocoating resin contained in the paint is not too small, the densities of the inorganic particles and inorganic glass particles contained in the paint tend not to become too high, and the ratio of solid-state components (particles) in the coat film deposited by the electrocoating process also tends not to become too high. Consequently, since the flowability of the coat film during application of the electrocoating current is good, the path formation and coat film formation on the periphery of the paths are likely to progress. As a result, desired concave portions are also likely to be formed on the surface of the exhaust pipe. Moreover, when the amounts of the inorganic particles and inorganic glass particles contained in the paint are not too large, the precipitations of the inorganic particles and the inorganic glass particles tend not to easily occur, and the particle concentration in the coating solution tends not to easily change to hardly cause fluctuations in the coating conditions. As a result, it becomes easier to form the coat film in a stable manner. Moreover, the sedimentation of the particles onto the bottom surface of the electrocoating vessel tends not to cause another problem.

In the method for producing an exhaust pipe according to the embodiment of the present invention, since the weight ratio of the electrocoating resin based on the weight of the inorganic glass particles or the weight ratio of the electrocoating resin based on the total weight of the inorganic particles and inorganic glass particles falls within a predetermined range, it becomes easier to form a desired surface coating layer on the surface of the exhaust pipe without causing these problems.

In the method for producing an exhaust pipe according to the embodiment of the present invention, the inorganic particles in the surface coating layer preferably have an average interparticle distance of about 3 μm or less.

In the method for producing an exhaust pipe according to the embodiment of the present invention, the inorganic particles are preferably oxides of a transition metal.

In the method for producing an exhaust pipe according to the embodiment of the present invention, the inorganic glass particles preferably have a softening point of from about 300° C. to about 1000° C.

The following description will discuss one embodiment of the present invention.

In a method for producing an exhaust pipe in accordance with the present embodiment, a predetermined paint is used.

First, the paint in accordance with the present embodiment will be described.

The paint in accordance with the present embodiment contains inorganic glass particles and an electrocoating resin.

The inorganic glass particles are preferably prepared as low-melting-point glass having a softening point of from about 300° C. to about 1000° C. Examples of the low-melting-point glass include, but are not particularly limited to, soda-lime glass, non-alkali glass, borosilicate glass, potash glass, crystal glass, titanium crystal glass, barium glass, boron glass, strontium glass, alumina silicate glass, soda zinc glass, and soda barium glass. These glasses may be used alone, or two or more kinds of these may be mixed.

In the case where the above-mentioned low-melting point glass has its softening point in a range from about 300° C. to about 1000° C., after the low-melting point glass has been fused and applied (coated) onto the outer circumferential surface of a base material (metal base material), by subjecting the low-melting point glass to a heating and firing treatment, a surface coating layer can be firmly formed on the outer circumferential surface of the base material easily.

In the case where the softening point of the low-melting point glass is not lower than about 300° C., upon application of heat when used as an exhaust pipe, the low-melting point glass does not easily soften so that, when external foreign matters such as stone and sand are brought into contact therewith, they tend not to be easily attached to the softened low-melting point glass. When the foreign matters are attached to the surface, the surface coating layer having high radiation rate is covered with the foreign matters, causing a possibility of failing to provide an exhaust pipe having a high heat releasing characteristic at high temperature.

On the other hand, in the case where the softening point of the low-melting point glass is not higher than about 1000° C., since a heating treatment of lower than about 1000° C. is sufficient for the heat treatment, the base material tends not to deteriorate due to exposure to high temperature in the heating treatment upon forming a surface coating layer of the exhaust pipe.

Additionally, the softening point of the low-melting point glass can be measured by using, for example, an automatic measuring apparatus of glass softening and strain points (SSPM-31) manufactured by OPT Corporation, based on a method according to JIS R 3103-1:2001.

Examples of the borosilicate glass include, but are not particularly limited to, $SiO_2$—$B_2O_2$—ZnO glass and $SiO_2$—$B_2O_2$—$Bi_2O_2$ glass. The crystal glass refers to glass containing PbO, and examples thereof include, but are not particularly limited to, $SiO_2$—PbO glass, $SiO_2$—PbO—$B_2O_2$ glass, and $SiO_2$—$B_2O_2$—PbO glass. Examples of the boron glass include, but are not particularly limited to, $B_2O_3$—ZnO—PbO glass, $B_2O_3$—ZnO—$Bi_2O_3$ glass, $B_2O_3$—$Bi_2O_3$ glass, and $B_2O_3$—ZnO glass. Examples of the barium glass include, but are not particularly limited to, BaO—$SiO_2$ glass.

The average particle diameter of the inorganic glass particles is not particularly limited, but is desirably about 3 μm or less. When the average particle diameter of the inorganic glass particles is about 3 μm or less, the size of the particles tends not to become ununiform. In this case, during an electrocoating process, since the flow of the coating film is less likely to be locally disturbed, paths are likely to be formed so that concave portions are likely to be formed on the surface of the exhaust pipe.

Moreover, in the case where the average particle diameter of the inorganic glass particles are about 3 μm or less, at the time of firing, softened inorganic glass particles tend not to fill in the concave portions on the surface of the exhaust pipe so that concave portions are not likely to be hardly formed on the surface of the exhaust pipe in a favorable manner.

Furthermore, in the case where the average particle diameter of the inorganic glass particles exceeds about 3 μm or less, it is easier to stabilize inorganic glass particles in a solution of a paint during the electrocoating process.

The average particle diameter of the inorganic glass particles is desirably about 0.1 μm or more. When the average particle diameter of the inorganic glass particles is about 0.1 μm or more, the glass component tends not to elute into the paint, hardly disturbing the stability of the paint.

The paint desirably contains inorganic particles.

As the inorganic particles, an oxide of a transition metal is desirably used, and more desirably, the oxide is at least one kind of oxides of manganese, iron, copper, cobalt, chromium and nickel.

These inorganic particles may be used alone, or two or more kinds of these may be mixed with one another.

Since the oxides of these transition metals have high emissivity as material physical properties, infrared rays are strongly irradiated when heated so that the heat releasing characteristic of the exhaust pipe exerted by radiant heat transfer tends to be improved.

The average particle diameter of the inorganic particles and the average particle diameter of the inorganic glass particles are not particularly limited, and one or both of the average particle diameter of the inorganic particles and the average diameter of the inorganic glass particles may be larger than about 3 μm; however, desirably, the average particle diameter of the inorganic particles is about 3 μm or less, and the average particle diameter of the inorganic glass particles is about 3 μm or less.

More desirably, the average particle diameter of the inorganic particles is about 1 μm or less, and the average particle diameter of the inorganic glass particles is about 1 μm or less. Furthermore desirably, the average particle diameter of the inorganic particles is about 0.9 μm or less, and the average particle diameter of the inorganic glass particles is about 0.8 μm or less.

In the case where one or both of the average particle diameter of the inorganic particles and the average diameter of the inorganic glass particles is about 3 μm or less, the sizes of particles easily tend not to become ununiform. In this case, during the electrocoating process, since the flow of the coating film tends not to be locally disturbed, paths are likely to be formed, with the result that concave portions are likely to be formed on the surface of the exhaust pipe.

Moreover, in the case where the average particle diameter of the inorganic glass particles is about 3 μm or less, at the time of firing, softened inorganic glass particles tend not to fill in the concave portions on the surface of the exhaust pipe so that concave portions are less likely to be unable to be preferably formed on the surface of the exhaust pipe.

Moreover, in the case where the average particle diameter of the inorganic particles is about 3 μm or less, at the time of firing, solid-state inorganic particles are dispersed in softened inorganic glass particles in a liquid state. In this case, when the inorganic particles are small, composite particles between the softened inorganic glass particles and the inorganic particles have high viscosity and low flowability in comparison with the case where the inorganic particles are large so that the composite particles tend not to fill in the concave portions on the surface of the exhaust pipe. When the concave portions are filled therewith, the surface area of the surface coating layer becomes small, causing a reduction in emissivity.

Moreover, the average particle diameter of the inorganic particles is desirably about 0.1 μm or more. The average particle diameter of the inorganic glass particles is desirably about 0.1 μm or more.

The average particle diameter of the inorganic particles and the average particle diameter of the inorganic glass particles can be measured by using, for example, a Shimadzu nano-particle size distribution measuring apparatus (SALD-7100) manufactured by SHIMADZU Corporation.

The amount of the inorganic glass particles blended is about 40% by weight as a desirable lower limit and about 99.5% by weight as a desirable upper limit based on the total weight of the powder of the inorganic glass particles and the powder of the inorganic particles.

The inorganic glass particles correspond to a material that softens in the firing step to form a matrix.

In the case where the amount of the inorganic glass particles blended is not less than about 40% by weight, since the amount of the inorganic glass particles is not too small based on the amount of the inorganic particles, a matrix is likely to be formed sufficiently so that the inorganic glass particles tend to fill in gaps among the inorganic particles, and thus a surface coating layer with few voids is likely to be formed. The surface coating layer with many voids causes a reduction in strength of the surface coating layer, failing to provide adhesion.

Moreover, in the case where the amount of the inorganic glass particles blended is not less than about 40% by weight, since the number of the inorganic glass particles that are brought into contact with a metal base material tends not to become too small to hardly cause a reduction in a contact area between the softened inorganic glass particles and the metal base material during the firing process so that the surface coating layer tends to be sufficiently bonded onto the metal base material. Consequently, at the time of firing or upon loading thermal impact, the surface coating layer tends not to easily drop off (to be separated).

On the other hand, when the amount of the inorganic glass particles blended is not more than about 99.5% by weight, the amount of the inorganic particles tends not to become too small, and the heat releasing characteristic of the produced exhaust pipe tends not to easily deteriorate.

The amount of the inorganic glass particles blended is about 60% by weight as a more desirable lower limit and about 80% by weight as a more desirable upper limit.

The paint may not contain the inorganic particles. Even in this case, as described with reference to FIG. 2A to FIG. 2E, it is possible to obtain an exhaust pipe that is superior in heat releasing characteristic to a certain degree because of the electrocoating resin contained in the paint.

In the case where the inorganic particles are contained in the paint, the amount of the inorganic particles blended is about 0.5% by weight as a desirable lower limit and about 60% by weight as a desirable upper limit based on the total weight of the powder of the inorganic glass particles and the powder of the inorganic particles.

In the case where the amount of the inorganic particles blended is not less than about 0.5% by weight, since the amount of the inorganic particles is not too small based on that of the inorganic glass particles, the heat releasing characteristic of the exhaust pipe tends not to easily deteriorate. On the other hand, in the case where the amount of the inorganic particles blended is not more than about 60% by weight, the amount of the inorganic glass particles that contribute to bonding between the surface coating layer and the metal base material tend not to become too small, the surface coating layer in the produced exhaust pipe tends not to easily drop off.

The amount of the inorganic particles blended is about 20% by weight as a more desirable lower limit and about 40% by weight as a more desirable upper limit.

The electrocoating resin is desirably prepared as an anionic electrocoating resin.

The anionic electrocoating resin has an anionic group. The anionic group is a functional group that reacts with a base to form a salt. Examples of the anionic group include, but are not particularly limited to, a carboxyl group, a sulfonic acid group, and a phosphoric acid group.

Moreover, examples of the anionic electrocoating resin include, but are not particularly limited to, an acrylic resin, an epoxy resin, a polyurethane resin, a maleic resin, a polyester resin, and a polybutadiene resin.

Examples of the acrylic resin include, but are not particularly limited to, copolymer acrylic resins obtained by polymerizing a carboxyl group-containing ethylene polymerizable monomer and a monomer composition including other ethylene polymerizable monomers.

Examples of the carboxyl group-containing ethylene polymerizable monomer include, but are not particularly limited to, (meth)acrylic acid, a (meth)acrylic acid dimer, crotonic acid, 2-(meth)acryloyloxyethyl phthalic acid, 2-(meth)acryloyloxyethyl succinic acid, 2-(meth)acryloyloxyethyl acid phosphate, 2-(meth)acrylamide-2-methylpropane sulfonic acid, ω-carboxy-polycaprolactone mono(meth)acrylate, isocrotonic acid, α-hydro-ω-((1-oxo-2-propenyl)oxy)poly(oxy(1-oxo-1,6-hexanediyl), maleic acid, fumaric acid, itaconic acid, 2-vinylsalicylic acid, and 3-vinylacetyl salicylic acid. These may be used alone, or two or more kinds of these may be used in combination.

Examples of the other ethylene polymerizable monomer include, but are not particularly limited to, (meth)acrylates having an ester unit with one or more carbon atoms (for example, methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, 2-ethylhexyl(meth)acrylate, lauryl(meth)acrylate, phenyl(meth)acrylate, isobornyl(meth)acrylate, cyclohexyl(meth)acrylate, t-butylcyclohexyl(meth)acrylate, dicyclopentadienyl(meth)acrylate, dihydrodicyclopentadienyl(meth)acrylate, etc.), polymerizable amide compounds (for example, (meth)acrylamide, N-methylol(meth)acrylamide, N,N-dimethyl(meth)acrylamide, N,N-dibutyl(meth)acrylamide, N,N-dioctyl(meth)acrylamide, N-monobutyl(meth)acrylamide, N-monooctyl(meth)acrylamide, 2,4-dihydroxy-4'-vinylbenzophenone, N-(2-hydroxyethyl)(meth)acrylamide, etc.), polymerizable aromatic compounds (for example, styrene, α-methyl styrene, t-butyl styrene, parachlorostyrene, vinyl naphthalene, etc.), polymerizable nitriles (for example, (meth)acrylonitrile, etc.), α-olefins (for example, ethylene, propylene, etc.), vinyl esters (for example, vinyl acetate, vinyl propionate, etc.), dienes (for example, butadiene, isoprene, etc.), hydroxyethyl(meth)acrylate, hydroxypropyl(meth)acrylate, hydroxybutyl(meth)acrylate, allyl alcohol, (meth)acryl alcohol, and adducts of hydroxyethyl(meth)acrylate and ϵ-caprolactone. These may be used alone, or two or more of these may be used in combination.

In the case where two or more kinds of (meth)acrylates are used in combination as the (meth)acrylate having an ester unit with one or more carbon atoms, (meth)acrylate having an ester unit with one or two carbon atoms is desirably included in the two or more kinds of (meth)acrylates.

In particular, when inorganic particles are contained in the paint, the electrocoating resin is desirably prepared as an anionic electrocoating resin.

Figure 3:
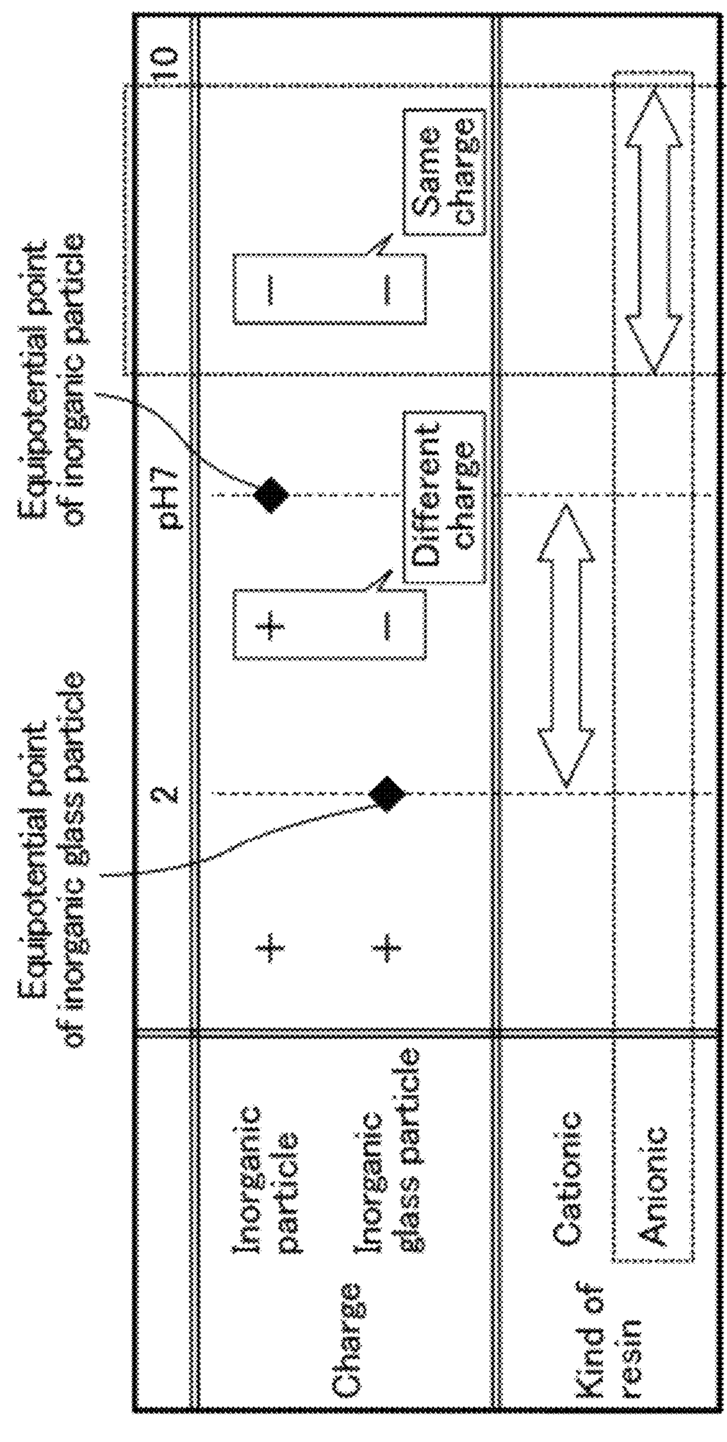
FIG. 3 is an explanatory drawing that illustrates a corresponding relationship between a pH value and an electric charge with respect to inorganic glass particles and inorganic particles in accordance with the present embodiment.

Referring to FIG. 3, the following description will describe the reasons for this.

FIG. 3 is an explanatory drawing that illustrates a corresponding relationship between a pH value and an electric charge with respect to inorganic glass particles and inorganic particles in accordance with the present embodiment.

As shown in FIG. 3, the equipotential point of the inorganic glass particles is about a pH value of 2. Therefore, under an environment having a pH value smaller than 2, the inorganic glass particles are charged positively, while under an environment having a pH value greater than 2, the inorganic particles are charged negatively.

Moreover, the equipotential point of the inorganic particles is about a pH value of 7. Therefore, under an environment having a pH value smaller than 7, the inorganic particles are charged positively, while under an environment having a pH value greater than 7, the inorganic particles are charged negatively.

In other words, under an acidic environment of pH 2 to 7, the electric charge possessed by the inorganic glass particles is different from the electric charge possessed by the inorganic particles, while under an alkaline environment, the electric charge possessed by the inorganic glass particles is the same as the electric charge possessed by the inorganic particles.

Therefore, in order to allow both the inorganic glass particles and the inorganic particles to deposit simultaneously, it is desirable to carry out the electrocoating process under an alkaline environment.

As described above, in the anionic electrocoating process, since a base is used as a neutralizer to an anionic electrocoating resin, the electrocoating process is carried out under an alkaline environment. On the other hand, in the cationic electrocoating process, since an acid is used as a neutralizer to a cationic electrocoating resin, the electrocoating process is carried out under an acidic environment.

Therefore, in the anionic electrocoating process and the cationic electrocoating process, the anionic electrocoating process that is carried out under an alkaline environment is more desirable. That is, as the electrocoating resin contained in the paint, the anionic electrocoating resin is more desirably used than the cationic electrocoating resin.

As described above, the anionic electrocoating resin is more desirably used as the electrocoating resin; however, the cationic electrocoating resin may also be used. In the case of using the cationic electrocoating resin, although the use of the cationic electrocoating resin is inferior to the use of the anionic electrocoating resin in stability of the paint and easiness in forming concave portions, the cationic electrocoating resin is not necessarily unusable in the present embodiment.

The cationic electrocoating resin has a cationic group. The cationic group is a functional group that reacts with an acid to form a salt. Examples of the cationic group include, but are not particularly limited to, an amino group, a sulfide group, and a phosphine group.

Moreover, examples of the cationic electrocoating resin include, but are not particularly limited to, an acrylic resin, an epoxy resin, and a polyester resin.

In the case where the epoxy resin is an amino group-containing epoxy resin, the electrocoating resin can be produced by ring-opening the epoxy ring inside the raw material epoxy resin molecule through a reaction with amines such as a primary amine, a secondary amine, and a tertiary amine.

Examples of the raw material epoxy resin include, but are not particularly limited to, polyphenol polyglycidyl ether-type epoxy resins that are reaction products between polycyclic phenolic compounds and epichlorohydrin, such as a bisphenol A-type epoxy resin, a bisphenol F-type epoxy resin, a bisphenol S-type epoxy resin, phenol novolac, and cresol novolac, and oxazolidonering-containing epoxy resins that are obtained by reaction of bisurethane compounds obtained by blocking a diisocyanate compound or an NCO group of a diisocyanate compound by a lower alcohol such as methanol, ethanol or the like, and epichlorohydrin.

Examples of the amines include, but are not particularly limited to, butyl amine, octyl amine, diethyl amine, dibutyl amine, methylbutyl amine, monoethanol amine, diethanol amine, N-methylethanol amine, a triethyl amine acid salt, an N,N-dimethylethanol amine acid salt, and ketimine-blocked aminogroup-containing polyamine.

The ketimine-blocked amino group-containing polyamine refers to an amine in which an amino group is blocked by ketimine. Examples of the ketimine-blocked amino group-containing polyamine include polyamines such as amino ethylethanol amine, diethylene triamine, dipropylene triamine, dibutylene triamine, and triethylene tetramine in which an amino group in polyamines is converted to ketimine by reaction with ketones such as acetone, methylethylketone, and methylisobutylketone (for example, ketimine-blocked primary amino group-containing secondary amines, such as diethylene triamine methylisobutyl ketimine and aminoethylethanol amine methylisobutyl ketimine).

Examples of the acrylic resins include, but are not particularly limited to, those resins obtained by allowing an amine to react with the oxysilane ring of the resultant product obtained by copolymerizing (meth)acrylate, hydroxyl group-containing (meth)acrylate monomers (for example, added products between hydroxyl group-containing (meth)acrylesters, such as 2-hydroxyethyl(meth)acrylate, 2-hydroxypropyl(meth) acrylate and 2-hydroxyethyl(meth)acrylate, ands-caprolactone), other acrylic and/or non-acrylic monomers, and those resins obtained by copolymerizing an acrylic monomer having an amino group without using glycidyl(meth)acrylate.

As the electrocoating resin, only one kind of the electrocoating resin may be used, or a plurality of kinds of electrocoating resins may be used.

Moreover, with respect to the paint, an organic binder material may be formed only by an electrocoating resin or an organic binder material other than the electrocoating resin may be contained therein. Examples of the organic binder material other than the electrocoating resin include polyvinyl alcohol, methylcellulose and ethylcellulose. These may be used alone or two or more kinds of these may be used in combination.

Each of the plurality of kinds of electrocoating resins desirably has mutually different $T_g$.

During the electrocoating process, the flowability of the electrocoating resin varies at temperature in the vicinity of the $T_g$, and in the case where the $T_g$'s of the plurality of kinds of electrocoating resins are mutually different from one another, the flowability of the electrocoating resin tends to be prevented from being abruptly changed. When the $T_g$'s of the plurality of kinds of electrocoating resins have mutually different $T_g$'s, the paint becomes less vulnerable to influences from the temperature at the time of application thereof so that it becomes easier to carry out a stable coatfilm forming process, with a comparatively wide temperature range, and consequently to alleviate the temperature dependence of the paint at the time of the application thereof. As a result, it is considered that an exhaust pipe having a surface coating layer with desired concave portions formed on the surface thereof is likely to be obtained.

Moreover, the $T_g$ of the electrocoating resin is desirably from about 5° C. to about 50° C.

In the case where the $T_g$ of the electrocoating resin is not less than about 5° C., the viscosity as a coat film is not low, and the resin tends not to easily flow. Consequently, during the electrocoating process, when paths are once formed on the coat film, the peripheral electrocoating resin is not soft as a coat film and tends not to easily flow, the paths are not easily filled with the coat film. For this reason, preferable concave portions tend to be formed, and it becomes easier to obtain a surface coating layer having high emissivity. On the contrary, when the $T_g$ of the electrocoating resin is not higher than about 50° C., the electrocoating resin tends not to become too hard at room temperature and tends not to flow too easily. As a result, desired paths are likely to be formed on the coat film. For this reason, preferable concave portions are likely to be formed, and it becomes easier to obtain a surface coating layer having high emissivity. Moreover, in the case where the $T_g$ of the electrocoating resin is not higher than about 50° C., since the flowability of the electrocoating resin tends not to deteriorate, inner moisture is likely to be drawn at the time of drying and curing, and time is not required for the drying and curing processes. For this reason, a working efficiency is improved, which lowers costs.

However, the $T_g$ of the electrocoating resin may fall outside the range of from about 5° C. to about 50° C. In the case of using the plurality of kinds of electrocoating resins, an electrocoating resin having $T_g$ falling out of the range of from about 5° C. to about 50° C. may be contained among the plurality of kinds of electrocoating resins, or all $T_g$'s of the electrocoating resins may fall outside the range of from about 5° C. to about 50° C.

Additionally, $T_g$ refers to a glass transition point, and can be measured by a DSC (Differential Scanning calorimeter) according to JIS K 7121: 1987.

The weight ratio of the electrocoating resin based on the total weight of the inorganic particles and the inorganic glass particles is desirably from about 1.0 to about 3.5.

In the case where no inorganic particles are contained in the paint, the weight ratio of the electrocoating resin relative to the weight of the inorganic glass particles is desirably from about 1.0 to about 3.5.

In the case where the weight ratio of the electrocoating resin based on the total weight of the inorganic particles and the inorganic glass particles is not more than about 3.5 (including the case where the weight of the inorganic particles is 0), since the amount of the electrocoating resin contained in the paint is not too large, the volume ratios of the inorganic particles and inorganic glass particles tends not to become too low, and the inorganic particles and the inorganic glass particles are less likely to be separated from one another within the coat film. Consequently, the inorganic particles and the inorganic glass particles are likely to be combined with each other; therefore, upon degreasing the electrocoating resin, even when the electrocoating resin is heated and burned out, the inorganic particles and the inorganic glass particles tend not to collapse and tend not to easily drop off. As a result, it becomes easier to obtain a surface coating layer having high emissivity.

On the other hand, in the case where the weight ratio of the electrocoating resin based on the total weight of the inorganic particles and the inorganic glass particles is not less than 1.0 (including the case where the weight of the inorganic particles is 0), since the amount of the electrocoating resin is not too small, the densities of the inorganic particles and inorganic glass particles contained in the paint tends not to become too high, and the ratio of solid-state components (particles) in the coat film deposited by the electrocoating process also tends not to become too high. Consequently, since the flowability of the coat film during application of the electrocoating current is good, the path formation and coat film formation on the periphery of the paths tend to progress. As a result, desired concave portions are also likely to be formed on the surface of the exhaust pipe. As a result, desired concave portions are also likely to be formed on the surface of the exhaust pipe. Therefore, it becomes easier to obtain a surface coating layer having high emissivity. Moreover, when the amounts of the inorganic particles and inorganic glass particles contained in the paint are not too great, the precipitation of the organic particles and the organic glass particles tends not to easily occur, and the particle concentration in the coating solution tends not to easily change to hardly cause fluctuations in the coating conditions. As a result, it becomes easier to form the coat film in a stable manner. Moreover, the sedimentation of the particles onto the bottom surface of the electrocoating vessel tends not to cause another problem.

The weight ratio of the electrocoating resin based on the total amount of the inorganic particles and the inorganic glass particles may fall outside the range of from about 1.0 to about 3.5. Moreover, in the case where no inorganic particles are contained in the paint, the weight ratio of the electrocoating resin based on the weight of the inorganic glass particles may fall outside the range of from about 1.0 to about 3.5.

In addition to the inorganic glass particles, the inorganic particles and the organic binder material, the paint may contain a pigment, a neutralizer, a curing agent, a dispersion medium, various other additives, and the like.

Examples of the pigment include a colorant pigment, an extender pigment, and a rust-proofing pigment.

Examples of the colorant pigment include Titanium White, carbon black, iron oxide red, Phthalocyanine Blue, Phthalocyanine Green, monoazo yellow, cisazo yellow, Benzimidazolone Yellow, Quinacridone Red, monoazo red, polyazo red, and Perylene Red.

Examples of the extender pigment include kaolin, talc, aluminum silicate, calcium carbonate, mica, clay, and silica.

Examples of the rust-proofing pigment include zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate, aluminum phosphomolybdate, and aluminum zinc phosphomolybdate.

Examples of the neutralizer for the anionic electrocoating resin include bases, such as ammonia, organic amine, and alkali metal hydroxide.

Examples of the organic amine include diethyl amine, ethylethanol amine, diethanol amine, monoethanol amine, monopropanol amine, isopropanol amine, ethylaminoethyl amine, hydroxyethyl amine, and diethylene triamine.

Examples of the alkali metal hydroxide include sodium hydroxide and potassium hydroxide.

Examples of the neutralizer for the cationic electrocoating resin include acids, such as hydrochloric acid, nitric acid, phosphoric acid, formic acid, acetic acid, and lactic acid.

Examples of the curing agent for the anionic electrocoating resin include a melamine resin and block polyisocyanate.

Examples of the curing agent for the cationic electrocoating resin include block polyisocyanate.

The block polyisocyanate is obtained by blocking polyisocyanate using a blocking agent.

Polyisocyanate refers to a compound having two or more isocyanate groups in one molecule.

Examples of the dispersion medium include water, or organic solvents such as methanol, ethanol and acetone.

Examples of the various other additives include an additive to be blended so as to carry out the electrocoating process, a surfactant, an antioxidant, and an ultraviolet ray absorbing agent.

Examples of the additive to be blended so as to carry out the electrocoating process include an additive for use in controlling a zeta potential and/or adjusting the resistance value of the solution, and a stabilizer for use in ensuring the dispersibility of the inorganic glass particles and/or inorganic particles.

The above description has discussed the paint in accordance with the present embodiment.

In the present embodiment, an exhaust pipe is produced using the paint.

The following description will discuss a method for producing an exhaust pipe in accordance with the present embodiment.

Additionally, the following description will discuss the case where inorganic particles are contained in the paint.

(1) Production of Paint

By dry mixing the above inorganic glass particles and inorganic particles, a mixed powder is produced.

More specifically, the powder of the inorganic glass particles and the powder of the inorganic particles are prepared so as to have predetermined particle size and shape, respectively, and by dry mixing the respective powders at a predetermined blending ratio, a mixed powder is prepared.

By adding the electrocoating resin and various additives such as water to the mixed powder thus prepared so as to be mixed with one another, the paint is produced.

(2) Preparation of Base Material

By using a base material made of metal (metal base material) as a starting material, the metal base material is subjected to a washing treatment so as to remove impurities from the surface thereof.

Examples of the material for the base material include, but are not particularly limited to, metals, such as stainless steel, steel, iron and copper, and nickel alloys, such as Inconel, Hastelloy and Invar. Since these metal materials have high thermal conductivity, these tend to contribute to an improvement in heat releasing characteristic of an exhaust pipe.

The washing treatment is not particularly limited, and conventionally known washing treatments can be used, and for example, a method for carrying out an ultrasonic washing process in an alcohol solvent may be used.

After the washing treatment, if necessary, a roughening treatment may be carried out on the surface of the base material so as to increase the specific surface area of the base material or to adjust the roughness of the surface of the base material. For example, roughening treatments, such as a sandblasting treatment, an etching treatment and a high-temperature oxidizing treatment, may be carried out. These treatments may be carried out alone, or two or more of these may be carried out in combination.

(3) Formation of Coat Film

The paint produced in the step (1) is applied to the surface of the metal base material prepared in the step (2) by electrocoating. More specifically, the metal base material and an electrode plate are placed in the paint, and one of the metal base material and the electrode plates is allowed to function as an anode, with the other being allowed to function as a cathode; thus, a voltage is applied thereto.

Then, the electrocoating resin that is in a soluble state carries the inorganic glass particles and the inorganic particles to the surface of the metal base material (see FIG. 2A). When brought into contact with the surface of the metal base material, the electrocoating resin changes from its soluble state to its insoluble state, and is deposited on the surface of the metal base material (see FIG. 2B and FIG. 2C). At this time, paths through which the soluble electrocoating resin is allowed to pass are formed in the coat film (see FIG. 2B and FIG. 2C). These paths are formed when the oxygen gas, which is generated when the electrocoating resin is brought into contact with the surface of the metal base material, thrusts the coat film that has already been formed aside to proceed into the coating solution.

The electrocoating process is desirably carried out normally by applying a voltage of from about 50 V to about 450 V at a bath temperature of from about 10° C. to about 45° C. for about 15 seconds to about 20 minutes, and the voltage is more desirably from about 60 V to about 300 V, the bath temperature is more desirably from about 26° C. to about 32° C., and a current-applying time is more desirably from about 30 seconds to about 10 minutes. Moreover, the solid component concentration of the paint is desirably from about 5% by weight to about 25% by weight, and the pH of the paint is desirably from about 8.0 to about 9.5.

In the case where the voltage is about 300 V or lower, a coat film of the paint that has been once formed on the surface of a body to be coated (metal base material) is less likely to be re-dissolved due to heat generated on the surface of the body to be coated. As a result, it is unlikely that the film thickness of the coat film does not grow thicker in spite of voltage application. On the other hand, in the case where the voltage is not lower than 60 V, since the load voltage is not too low, its force that attracts the electrocoating resin onto the body to be coated (metal base material) tends not to become weak. Thus, a sufficient thickness in the coat film of the paint is likely to be obtained. As a result, it becomes easier to obtain a surface coating layer having high emissivity.

When the bath temperature is not higher than about 32° C., the electrocoating resin in the coating solution tends not to be easily deteriorated due to heat. As a result, since the frequency of changes of the electrocoating resin due to deterioration of the paint does not increase, resulting in reduction in production costs. On the other hand, in the case where the bath temperature is not lower than 26° C., since the activity of the electrocoating resin is not low and the reaction rate on the surface of the body to be coated (metal base material) is not reduced, a coat film of the paint is likely to be obtainable. As a result, it becomes easier to obtain a surface coating layer having high emissivity.

In the case where the current-applying time is not more than about 10 minutes, since the current-applying time is not too long, a difference in film thicknesses of the coat film of the paint tends not to be easily generated between the perpendicular surface and horizontal surface of the body to be coated (metal base material) due to the fact that the solid components of the paint are less likely to be segmented. As a result, it becomes easier to obtain a surface coating layer having a uniform heat releasing characteristic over the entire surface. On the other hand, in the case where the current-applying time is not less than about 30 seconds, since the current-applying time is not too short, the growth of the coat film is not blocked halfway, which makes it easier to obtain a sufficient thickness of the coat film of the paint. As a result, it becomes easier to obtain a surface coating layer having high emissivity.

In the case where the solid component concentration of the paint is not more than about 25% by weight, since the flowability of the coat film deposited by electrocoating is not lowered, and heat and bubbles, which are generated on the surface of the body to be coated (metal base material), are likely to be removed, the coat film tends not to be re-dissolved in the coating solution, or bubbles remaining in the coat film are not likely to be thermally expanded upon heating to hardly cause bumping due to the fact that the temperature is less likely to be locally raised so that the surface state of the coat film of the paint tends not to deteriorate. As a result, it becomes easier to obtain a surface coating layer having high emissivity. On the other hand, in the case where the solid component concentration of the paint is not less than about 5% by weight, not only the electrocoating resin is deposited on the body to be coated (metal base material), but also an about certain amount of the inorganic glass particles and the inorganic particles are attached to the body to be coated (metal base material) so that the coat film of the paint is likely to be formed. Consequently, the surface coating layer that remains on the metal base material after firing process tends not to become thin. As a result, it becomes easier to obtain a surface coating layer having high emissivity.

In the case where the pH of the paint is not more than about 9.5, the coat film of the paint is likely to be deposited to hardly cause an increase in power consumption required for electrocoating of the paint. As a result waste energy tends not to increase. It is considered that this is caused by the fact that as a mechanism of the formation of a coat film in the electrocoating process, since the pH changes due to an electric reaction on the surface of the body to be coated (metal base material), the electrocoating resin is changed from its soluble characteristic to its insoluble characteristic to be deposited. In the case where the pH of the paint is not more than about 9.5, since the pH is not too high wastefully, the electrocoating resin is present in a soluble state and is not likely to be deposited, or the coat film once deposited tends not to be re-dissolved in the coating solution. Moreover, in the case where the pH of the paint is not more than about 9.5, it is unlikely that the coat film state of the paint is hardly stabilized due to bubbling. As a result, a large number of voids tend not to occur in the coat film, the strength of the surface coating layer tends not to be lowered, making it easier to obtain high adhesion.

On the other hand, in the case where the pH of the paint is not less than about 8.0, the pH value is not in the vicinity of pH at which the electrocoating resin itself changes from its insoluble characteristic to its soluble characteristic so that the state of the electrocoating resin is not on a border between the soluble state and the insoluble state, and the electrocoating resin does not change its characteristics between the soluble characteristic and the insoluble characteristic depending on the fluctuations of the pH so that it becomes unlikely that the electrocoating resin cannot exist in the solution in a stable manner. As a result, since the frequency of changes of the electrocoating resin due to deterioration of the paint tends not to increase, leading to reduction in production costs.

Additionally, in the case of using an anionic electrocoating resin as the electrocoating resin, the metal base material is allowed to function as an anode, and the electrode plate is allowed to function as a cathode. On the other hand, in the case of using a cationic electrocoating resin as the electrocoating resin, the metal base material is allowed to function as a cathode, and the electrode plate is allowed to function as an anode; thus, a voltage is applied thereto.

(4) Drying and Curing

The metal base material on which the paint has been applied in the step (3) is heated to a predetermined temperature so that the coat film of the paint formed on the surface of the metal base material is dried and cured. At this time, as moisture, volatile resin additives and the like are evaporated through the paths formed in the step (3), preliminary portions for concave portions are formed on the surface of the coat film (see FIG. 2D). In this case, the preliminary portions for concave portions refer to concave areas formed on the surface of the coat film, and the areas correspond to areas generated by deformed paths caused by drying and curing the coat film.

In the present step, the heating temperature is desirably from about 100° C. to about 200° C., more desirably from about 110° C. to about 190° C., and furthermore desirably from about 120° C. to about 180° C.

In the case where the heating temperature is not more than 200° C., since the temperature is not too high, the coat film of the paint is less likely to be cured too much. As a result, wasteful energy consumption tends not to be caused. On the other hand, in the case where the heating temperature is not less than about 100° C., the drying and curing tend not to become insufficient, and moisture or the solvent tends not to remain in the coat film. As a result, upon heating in the degreasing step or the firing step, it is unlikely that the residual moisture or solvent causes bumping so that the coat film is ruptured to cause partially unattachment portions (portions where voids are present in the surface coating layer). Moreover, since the coat film of the paint is likely to be sufficiently cured, the adhesion between the coat film and the metal base material is not likely to be lowered so that separation tends not to easily occur upon handling.

Moreover, the present step is desirably maintained at the heating temperature for a predetermined period of time, and the maintaining time is desirably in a range from about 5 minutes to about 90 minutes.

When the maintaining time is not more than about 90 minutes, the coat film of the paint tends not to be cured too much, hardly leading to wasteful time. On the other hand, when the maintaining time is not less than about 5 minutes, the drying and curing of the coat film of the paint tend not to become insufficient, and moisture or the solvent tends not to remain in the coat film. As a result, upon heating in the degreasing step or the firing step, it is unlikely that the residual moisture or solvent causes bumping so that the surface coating layer is ruptured to cause partially unattachment portions (portions where voids are present in the surface coating layer). Moreover, since the coat film of the paint is likely to be sufficiently cured, the adhesion between the coat film and the metal base material is not likely to be lowered so that separation tends not to easily occur upon handling.

(5) Degreasing

After the step (4), the metal base material is heated at temperature that is not less than the burning-out temperature of the electrocoating resin, and the electrocoating resin is burned out. Thus, the volume of the coat film is contracted so that concave portions are likely to be formed on the surface of the coat film based on the preliminary concave portions on the surface of the coat film formed in the step (4) (see FIG. 2E).

The burning-out temperature of the electrocoating resin refers to temperature at which the weight of the electrocoating resin is reduced by about 50%, and this temperature can be measured by a TG/DTA simultaneous measuring apparatus.

Although it also depends on the kind of the electrocoating resin blended thereto, the heating temperature in this step is desirably from about 300° C. to about 600° C., more desirably from about 325° C. to about 550° C., and furthermore desirably from about 350° C. to about 500° C.

In the case where the heating temperature is not higher than about 600° C., since the temperature is not too high, the softening of the inorganic glass particles tends not to occur before completion of the degreasing of the electrocoating resin. As a result, after the inorganic glass particles have softened to start the formation of a matrix, it is unlikely that the electrocoating resin is burned to generate a gas to cause bumping so that unattachment portions tend to easily occur. On the other hand, in the case where the heating temperature is not less than about 300° C., the degreasing of the electrocoating resin tends not to become insufficient. Thus, residual resin components are less likely to remain in the coat film. For this reason, upon a temperature rise in the following step (6) Firing, bumping is less likely to be caused so that unattachment portions tend not to occur.

In the present step, the heating temperature is maintained for a predetermined period of time. The maintaining time is desirably from about 5 minutes to about 90 minutes. Since the maintaining time of about 90 minutes allows the degreasing of the electrocoating resin to be sufficiently completed, the maintaining time of not more than about 90 minutes tends not to cause wasteful time. On the other hand, in the case where the maintaining time is not less than about 5 minutes, the degreasing of the electrocoating resin tends not to become insufficient, hardly causing residual resin components in the coat film. For this reason, upon a temperature rise in the following step (6) Firing, it is unlikely that the electrocoating resin is burned in the softened inorganic glass particles to generate a gas to cause bumping, and that holes through which the metal base material is exposed are caused on the surface of the surface coating layer. As a result, it becomes easier to obtain a surface coating layer having high emissivity.

Moreover, the temperature rising rate from the heating temperature in the step (4) Drying and curing to the heating temperature in the present step is desirably from about 1.7° C./minute to about 60.0° C./minute, more desirably from about 2.0° C./minute to about 30.0° C./minute, furthermore desirably from about 3.0° C./minute to about 15.0° C./minute, and still furthermore desirably from about 3.5° C./minute to about 5.0° C./minute.

In the case where the temperature rising rate is not more than about 60.0° C./minute, bumping of the resin component tends not to occur to hardly cause unattachment portions. On the other hand, in the case where the temperature rising rate is not less than about 1.7° C./minute, too much time is not required for the temperature rise to cause wasteful time.

As described above, in the step (5) Degreasing, the step is maintained at a predetermined temperature for a predetermined period. In this manner, in the step (5) Degreasing, it is an essential constitution "to be maintained at a predetermined temperature for a predetermined period".

In the present embodiment, such a step (5) Degreasing is desirably carried out; however, without preliminary carrying out the step (5) Degreasing, the following step (6) Firing may be carried out.

The following description will be given on the premise that the step (5) Degreasing is preliminarily carried out.

(6) Firing

After the step (5), the metal base material is heated to temperature that is not less than the softening point of the inorganic glass particles.

With this arrangement, the metal base material is likely to firmly adhere to the inorganic glass particles so that a surface coating layer that firmly adhere to the metal base material is likely to be formed. Moreover, since the inorganic glass particles are fused, the reduction rate of the film thickness of the coat film becomes great so that a surface coating layer with concave portions on its surface can be easily formed (see FIG. 2E).

Furthermore, when the inorganic particles are present in the coat film, since the flowability of the softened inorganic glass particles is lowered, and the flow of the coat film is suppressed on the periphery of concave portions, a surface coating layer with concave portions on its surface can be more easily formed. In contrast, in the case where no inorganic particles are present in the coat film, since the flow of the coat film is not suppressed on the periphery of concave portions, it becomes difficult to form a surface coating layer with concave portions on its surface, in comparison with the case where the inorganic particles are present in the coat film.

Although it also depends on the kind of the blended inorganic glass particles, the heating temperature in the present step is desirably from about 500° C. to about 1000° C., more desirably from about 600° C. to about 950° C., and furthermore desirably from about 700° C. to 900° C.

In the case where the heating temperature is not higher than about 1000° C., the metal base material tends not to deteriorate due to exposure to the high temperature. On the other hand, in the case of the heating temperature of not less than about 500° C., the softening of the inorganic glass particles tends not to become insufficient to hardly cause insufficient sintering so that the coating of the paint is likely to be densified to make it easier to obtain sufficient adhesion between the metal base material and the surface coating layer.

Additionally, the heating temperature of the present step is higher than the heating temperature in the step (5) Degreasing.

Moreover, the present step is desirably maintained at the heating temperature for a predetermined period of time, and the maintaining time is desirably in a range from about 1 minute to about 30 minutes.

When the maintaining time is not more than about 30 minutes, the metal base material tends not to deteriorate. On the other hand, when the maintaining time is not less than about 1 minute, the softening of the inorganic glass particles tends not to become insufficient, and the coating of the paint is likely to be densified to make it easier to obtain sufficient adhesion between the metal base material and the surface coating layer.

Moreover, the temperature rising rate from the heating temperature in the step (5) Degreasing to the heating temperature in the present steps is desirably from about 3.3° C./minute to about 100.0° C./minute, more desirably from about 4.0° C./minute to about 50.0° C./minute, furthermore desirably from about 5.0° C./minute to about 25.0° C. minute, and still furthermore desirably from about 6.0° C./minute to about 12.0° C./minute.

In the case where the temperature rising rate is not more than about 100.0° C./min, since the heat capacity of the metal base material is great to absorb heat, the entire portion of the metal base material is likely to be evenly heated. On the other hand, in the case where the temperature rising rate is not less than about 3.3° C./minute, too much time is not required for the temperature rise to hardly cause wasteful time.

By carrying out the above-mentioned steps, the exhaust pipe of the embodiment of the present invention having a surface coating layer formed on a metal base material can be produced.

Referring to FIG. 4 to FIG. 8, the following description will discuss the exhaust pipe produced in this manner.

Figure 4:
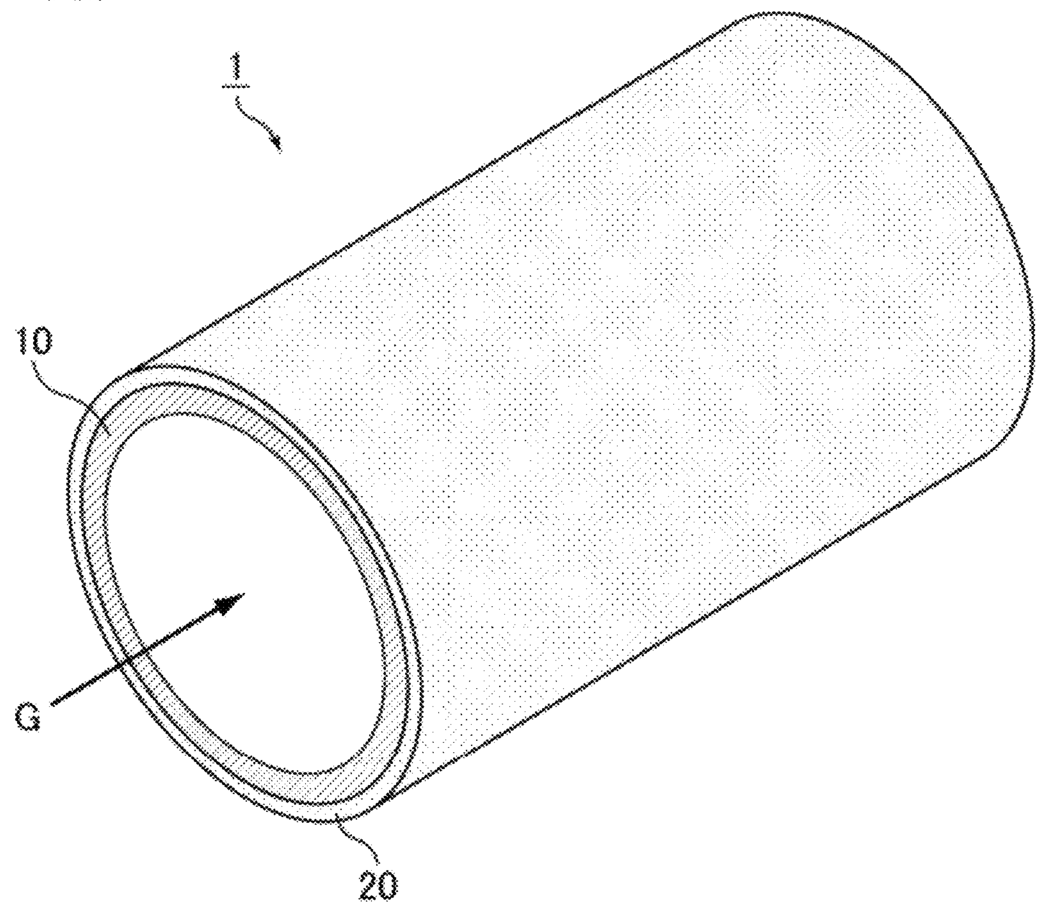
FIG. 4 is a perspective view that schematically illustrates an exhaust pipe in accordance with the present embodiment.

FIG. 4 is a perspective view that schematically illustrates an exhaust pipe in accordance with the present embodiment.

Figure 5:
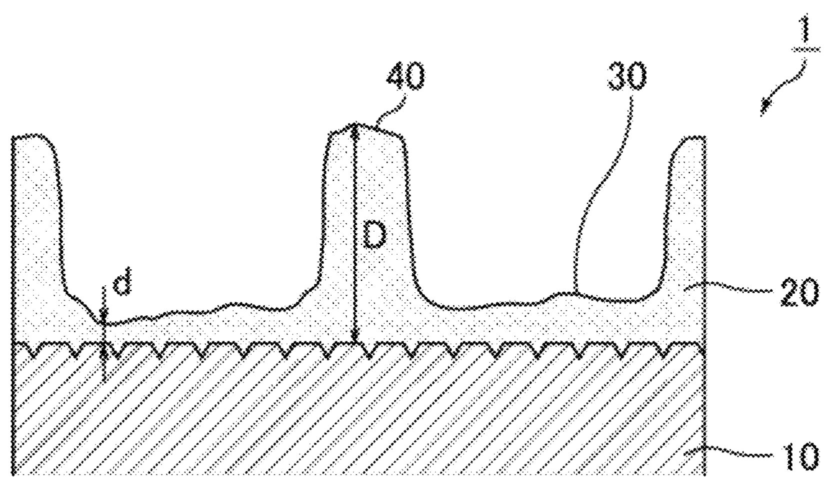
FIG. 5 is a partially expanded cross-sectional view that schematically illustrates a cross section obtained by cutting the exhaust pipe shown in FIG. 4 in its longitudinal direction.

FIG. 5 is a partially expanded cross-sectional view that schematically illustrates a cross section obtained by cutting the exhaust pipe shown in FIG. 4 in its longitudinal direction. 4.

In FIG. 4, an exhaust gas is indicated by G, with flowing directions of the exhaust gas being indicated by arrows.

An exhaust pipe 1 shown in FIG. 4 is constituted by a substantially cylindrical metal base material 10 and a surface coating layer 20 formed on the outer circumferential surface of the metal base material 10 with a predetermined thickness.

As shown in FIG. 5, on the surface of the metal base material 10, irregularities are desirably formed. The surface roughness $Rz_{JIS}$ (JIS B 0601: 2001) on the outer circumferential surface of the metal base material having these irregularities formed thereon is desirably from about 1.5 μm to about 15.0 μm.

In the case where the surface roughness $Rz_{JIS}$ of the outer circumferential surface of the metal base material is not less than 1.5 μm, since the surface area of the metal base material becomes large, the adhesion between the metal base material and the surface coating layer tends to become sufficient. On the other hand, in the case where the surface roughness $Rz_{JIS}$ of the outer circumferential surface of the metal base material is not more than 15.0 μm, voids are less likely to be formed between the surface of the metal base material and the surface coating layer. This is presumably because when the surface roughness $Rz_{JIS}$ of the outer circumferential surface of the metal base material is too not too high, the paint tends to surely enter the concave portions of the irregularities formed on the surface of the metal base material. When the voids are formed between the surface of the metal base material and the surface coating layer, the adhesion between the metal base material and the surface coating layer becomes insufficient.

The surface coating layer 20 is a layer that is formed by subjecting the paint applied onto the metal base material 10 through an electrocoating process to respective treatments of drying, curing, degreasing and firing.

As shown in FIG. 5, concave portions 30 and convex portions 40 are present on the surface of the surface coating layer 20.

Figure 6A:
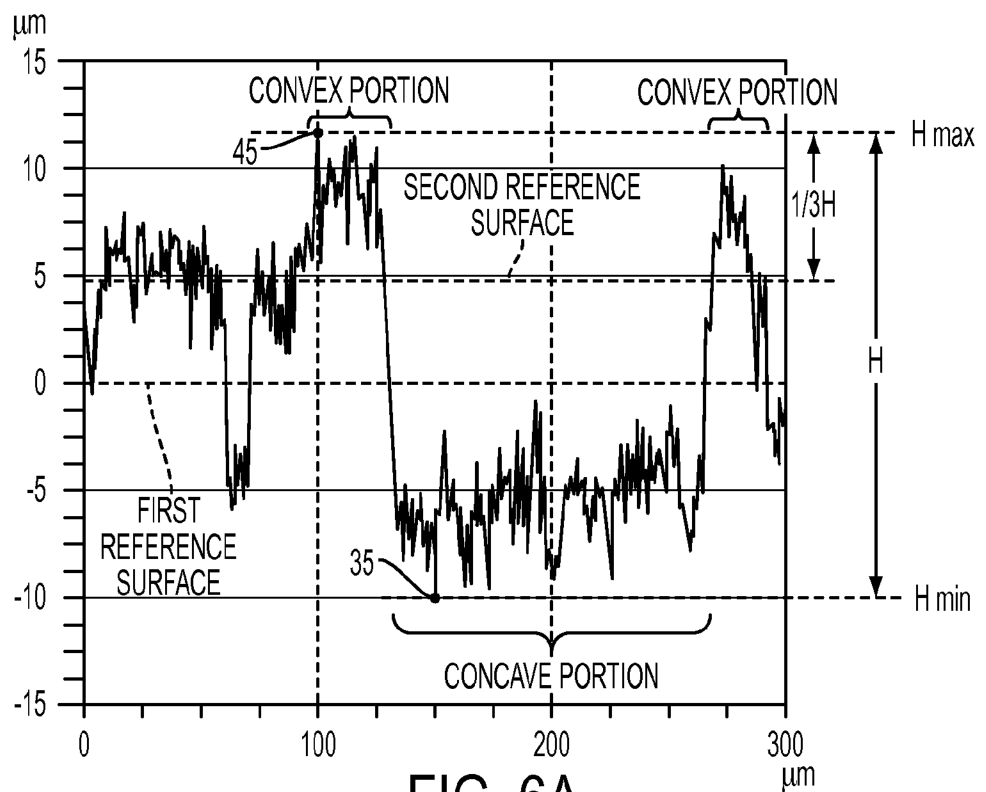
FIG. 6A is a partially expanded cross-sectional view that illustrates a cross section obtained by cutting the exhaust pipe shown in FIG. 4 in its longitudinal direction.
Figure 6B:
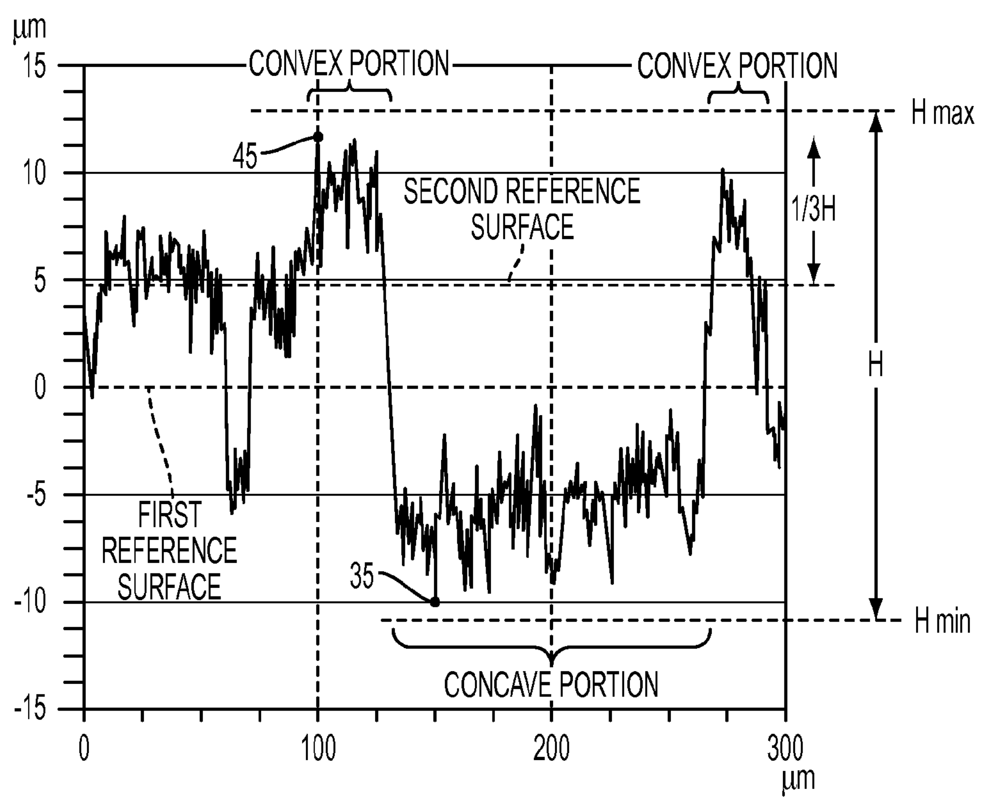
FIG. 6B is a partially expanded cross-sectional view that illustrates a cross section obtained by cutting the exhaust pipe shown in FIG. 4 in its longitudinal direction.

Referring to FIG. 6A and FIG. 6B, the following description will discuss the concave portions and convex portions on the surface coating layer.

FIG. 6A and FIG. 6B are partially expanded cross-sectional views, each illustrating a cross section obtained by cutting the exhaust pipe shown in FIG. 4 in its longitudinal direction.

As shown in FIG. 6A and FIG. 6B, the concave portions correspond to areas lower than a first reference surface, and the first reference surface is a surface having an average height of the surface of the surface coating layer.

In FIG. 6A and FIG. 6B, the first reference surface represents an average line.

The average line corresponds to an average line for use in defining a cross-sectional curve in accordance with JIS B0601 (2001), and is a curve representing a nominal profile applied to the cross-sectional curve using a least square method.

The nominal profile indicates a shape such as an inclination of a plane, and an arc shape of a cylindrical part.

The average line is automatically calculated by measuring a surface shape using a commercially available surface roughness measuring device (such as Wyko NT9100 (optical device), manufactured by Veeco Instruments) to obtain a cross-sectional curve.

As shown in FIG. 6A and FIG. 6B, the convex portions are areas higher than a second reference surface. The second reference surface is a surface having a height indicated by ($H_{max}$−H×⅓).

$H_{max}$ is the maximum value of the surface height of the surface coating layer. H is a difference between $H_{max}$ and $H_{min}$ and $H_{min}$ is the minimum value of the surface height of the surface coating layer.

As shown in FIG. 6A and FIG. 6B, the surface of the surface coating layer has an abrupt inclination from a concave portion to a convex portion.

In this case, $H_{max}$ is a height of the highest point among the entire surfaces of the surface coating layer 20. $H_{min}$ is a height of the lowest point among the entire surfaces of the surface coating layer 20.

FIG. 6A shows the case where the highest point 45 on the cross section corresponds to the highest point among the entire surfaces of the surface coating layer 20, and the lowest point 35 on the cross section corresponds to the lowest point among the entire surfaces of the surface coating layer 20.

FIG. 6B shows the case where the highest point among the entire surfaces of the surface coating layer 20 is higher than the highest point 45 on the cross section, and the lowest point among the entire surfaces of the surface coating layer 20 is lower than the lowest point 35 on the cross section.

The above description has discussed the concave portions and the convex portion on the surface coating layer.

In the present embodiment, on the peripheral edge portion of each concave portion of the surface coating layer, convex portions are present.

The following description will discuss the "peripheral edge portion".

Figure 7A:
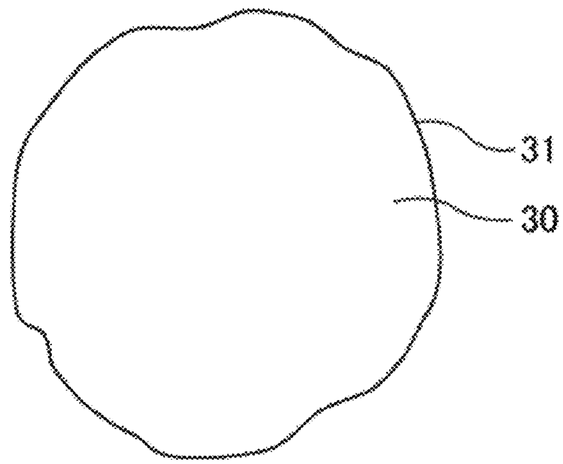
FIG. 7A is an explanatory drawing that schematically illustrates a concave portion in accordance with the present embodiment.

FIG. 7A is an explanatory drawing that schematically illustrates a concave portion in accordance with the present embodiment.

Figure 7B:
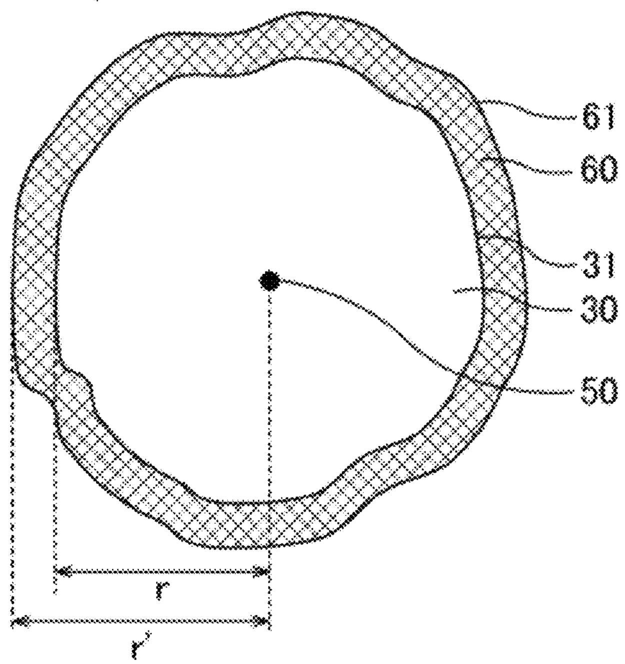
FIG. 7B is an explanatory drawing that schematically illustrates a peripheral edge portion in accordance with the present embodiment.

FIG. 7B is an explanatory drawing that schematically illustrates a peripheral edge portion in accordance with the present embodiment FIG. 7A schematically illustrates an appearance of the concave portion 30 when the surface coating layer is observed in the direction perpendicular to the surface of the metal base material. The concave portion 30 forms a graphic form 31 having a round shape.

FIG. 7B illustrates a graphic form 61 that is analogous to the graphic form 31. The center of gravity of the graphic form 61 is coincident with the center of gravity of the graphic form 31. The analogous ratio of the graphic form 31 and the graphic form 61 is r:r', and r'=1.2r is satisfied.

A peripheral edge portion 60 is an area corresponding to an area inside the graphic form 61 from which the concave portion 30 is excluded.

In the present embodiment, the convex portions are present on the peripheral edge portion of each concave portion of the surface coating layer in a manner of surrounding the concave portion. Among the areas of the peripheral edge portion, a ratio of the area occupied by the convex portions is desirably about 60% or more, more desirably about 80% or more, furthermore desirably about 90% or more, and still furthermore desirably 100%. This is because, as the ratio of the area occupied by the convex portions among the areas of the peripheral edge portion becomes higher, the surface area of the exhaust pipe becomes larger. In the case where the ratio of the area occupied by the convex portions among the areas of the peripheral edge portion is about 60% or more, since the surface area of the exhaust pipe is large, it becomes easier to sufficiently improve the heat releasing characteristic of the exhaust pipe.

Additionally, the concave portion in accordance with the present embodiment is an area having a peripheral edge portion on which the convex portions are present among areas lower than the first reference surface. That is, even when there is an area lower than the first reference surface, if the area has no convex portion on its peripheral edge portion, the area is not a concave portion.

Therefore, in the present embodiment, all areas lower than the first reference surface are not necessarily required to have convex portions on their peripheral portions. Here, supposing that the areas lower than the first reference surface are referred to as candidates for concave portions, it is only necessary to have an area having convex portions on its peripheral edge portion among the candidates for concave portions.

The concave portion is desirably designed to have a substantially round shape as its shape viewed in the direction perpendicular to the surface of the metal base material.

In the case where separation has once occurred at an edge portion of the concave portion, if the concave portion is formed by a straight line, the separation successively proceed sequentially; however, in the case where the shape of the concave portion is formed into a substantially round shape, since the separated surface coating layer is pulled by the peripheral surface coating layer, the separation hardly proceeds. Therefore, when the shape of the concave portion is substantially round shape, it becomes easier to improve the adhesion between the surface coating layer and the metal base material.

The following description will discuss “substantially round shape”.

Figure 7C:
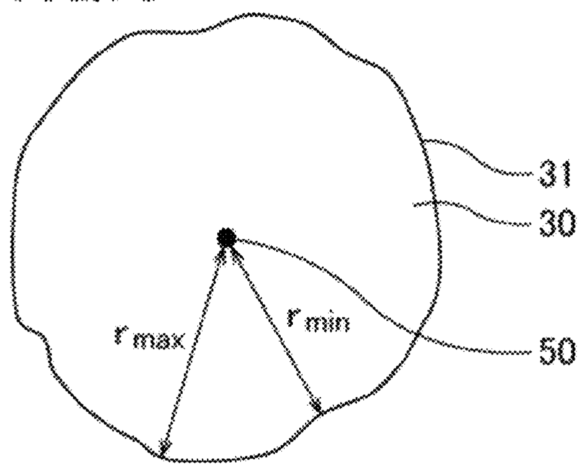
FIG. 7C is an explanatory drawing that schematically illustrates a concave portion in accordance with the present embodiment.

FIG. 7C is an explanatory view that schematically illustrates a concave portion in accordance with the present embodiment.

FIG. 7C shows the same concave portion 30 as the concave portion 30 shown in FIG. 7A.

In FIG. 7C, $r_{max}$ represents the maximum value of a distance between a point on the graphic form 31 and the center of gravity 50, and $r_{min}$ represents the minimum value of a distance between a point on the graphic form 31 and the center of gravity 50.

The “substantially round shape” refers to the case where a relationship, $r_{max}$<about $1.5r_{min}$, is satisfied.

Figure 8:
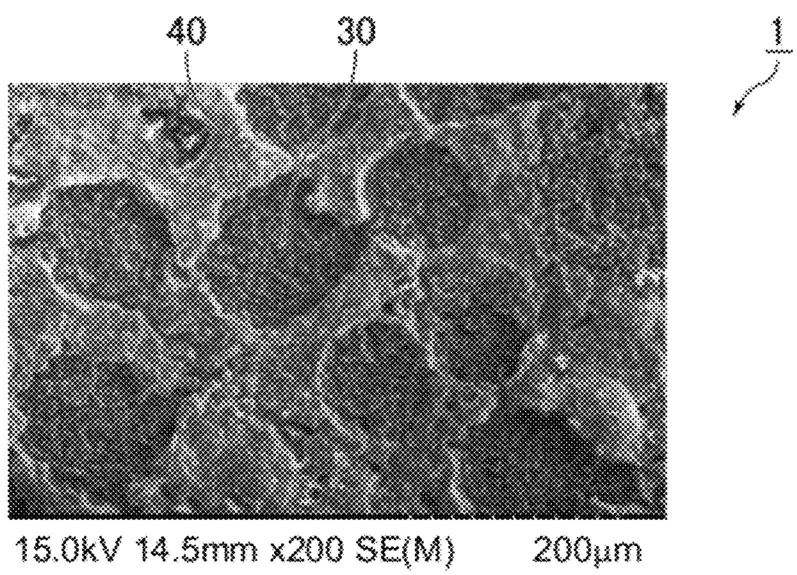
FIG. 8 is a photograph of the exhaust pipe of FIG. 4, taken in the direction perpendicular to the surface of the metal base material.

FIG. 8 is a photograph of the exhaust pipe of FIG. 4, taken in the direction perpendicular to the surface of the metal base material.

Additionally, the photograph shown in FIG. 8 is photographed through an electron microscope, with an accelerating voltage of 15.0 kV and a magnification of 200 times.

As shown in FIG. 8, the concave portion 30 has a round shape (virtually round shape) in its shape viewed in the direction perpendicular to the surface of the metal base material 10. In the present specification, such a shape of the concave portion 30 is referred to as a “substantially round shape”.

When the shape of the concave portion viewed in the direction perpendicular to the surface of the metal base material is substantially round shape (virtually round shape), the diameter of the circle is desirably from about 3 μm to about 2000 μm.

When taken into consideration that an increase in surface area of the surface coating layer contributes to an improvement in emissivity, it is considered that the size of the concave portion is desirably small, with its density being high.

However, in the case where the size of the concave portion is too small, the walls of the concave portion are made face to face with each other at positions with a close distance, and infrared rays to be radiated upon heating of the surface coating layer are hardly radiated outside of the surface coating layer so that the heat radiating effect becomes small. On the other hand, since the concave portion has low emissivity corresponding to the thinness of the thickness of the surface coating layer, the emissivity of the entire surface coating layer is lowered when the size of the concave portion is too large, failing to provide a high heat releasing characteristic.

In the case where the diameter of the circle is from about 3 μm to about 2000 μm, it becomes easier to obtain an exhaust pipe that is superior in heat releasing characteristic.

The diameter of the circle is more desirably about 1000 μm or less, and furthermore desirably about 120 μm or less.

In this case, the diameter of the circle corresponds to the largest length when a straight line is drawn inside the circle.

The density of the concave portions is desirably about 10 pieces/$cm^2$ to about $10^7$ pieces/$cm^2$.

When taken into consideration that an increase in surface area of the surface coating layer contributes to an improvement in emissivity, it is considered that the density of the concave portions is desirably high. In the case where the density of the concave portions is too low, since an increase in surface area is small, the effect for improving the emissivity is hardly obtained.

On the other hand, in the case where the density of the concave portions is too high, two different concave portions are made too close with each other so that portions thereof may possibly be partially overlapped with each other in some cases. When the two different concave portions are overlapped with each other, a convex-shaped portion is formed between the two different concave portions. Since this convex-shaped portion is lower than the first reference surface, this convex-shaped portion is not the aforementioned convex portion, and is not continuously formed in a manner of surrounding the concave portion. Consequently, the convex-shaped portion tends to be a portion that is easily separated. For this reason, separation occurs from the convex-shaped portion as a starting point with an elapse of time, and the emissivity may possibly be lowered.

In the case where the density of the concave portions is from about 10 pieces/$cm^2$ to about $10^7$ pieces/$cm^2$, it becomes easier to obtain an exhaust pipe having a superior heat releasing characteristic.

The density of the convex portions is more desirably about $1\times10^2$ pieces/$cm^2$ or more, and furthermore desirably about $5\times10^2$ pieces/$cm^2$ or more.

Supposing that the distance between the surface having a height of $H_{min}$ (see FIG. 6A and FIG. 6B) and the surface of the metal base material is defined as d (see FIG. 5), $d>0$ is desirably satisfied, and more desirably, $d\geq$about 2 μm is satisfied. $H_{min}$ is the minimum value of the height of the surface of the surface coating layer.

In the case of $d\geq0$, since the metal base material is not exposed to the surface of the exhaust pipe, the effect for improving the emissivity by the concave portions formed on the surface of the surface coating layer is likely to be sufficiently obtained, and since the emissivity of the metal base material exposed to the surface is low, it is considered that the effect for improving the emissivity tends not to become small. Therefore, in the case of $d\geq0$, it becomes easier to prevent lowering of the radiating characteristic.

In the present specification, a distance d between the surface having the height of $H_{min}$ and the surface of the metal base material is referred to also as “film thickness of the concave portion”. Moreover, a distance D between the surface having the height of $H_{max}$ and the surface of the metal base material is referred to also as “film thickness of the surface coating layer”.

Moreover, in the case of film thickness of the concave portion d=0, this state is referred to as "the concave portion penetrates the surface coating layer".

It is considered that the reason for the formation of the concave portion 30 of the surface coating layer 20 is described as follows:

In the electrocoating process, the electrocoating resin that is in a soluble state carries the inorganic glass particles and the inorganic particles to the surface of the metal base material 10 (see FIG. 2A). When brought into contact with the surface of the metal base material 10, the electrocoating resin changes from its soluble state to its insoluble state, and is deposited on the surface of the metal base material 10 (see FIG. 2B and FIG. 2C). At this time, paths through which the soluble electrocoating resin is allowed to pass are formed in the coat film of the paint (see FIG. 2B and FIG. 2C). These paths are formed when the oxygen gas, which is generated when the electrocoating resin is brought into contact with the surface of the metal base material, thrusts the coat film that has already been formed aside to proceed into the coating solution.

Thereafter, when the coat film of the paint is heated in the step (4) Drying and curing, moisture, volatile resin additives and the like are evaporated. At this time, as moisture, volatile resin additives and the like are evaporated through the paths, preliminary portions for concave portions are formed on the surface of the coat film (see FIG. 2D). Moreover, in the step (5) Degreasing, when the coat film is heated so as to remove the electrocoating resin in the coat film, the electrocoating resin is burned out, and the volume of the coat film is contracted. Thereafter, by subjecting the coat film to the firing treatment in the step (6) Firing, the surface coating layer 20 with the concave portions 30 formed thereon is formed (see FIG. 2E).

The surface coating layer 20 contains inorganic particles. The inorganic particles in the surface coating layer 20 desirably have an average interparticle distance of about 3 μm or less.

The inorganic particles have a function for improving emissivity. For this reason, in the case where portions where the inorganic particles are present are projected onto a surface in parallel with the surface of the metal base material, as the area of the projected portions becomes larger, the emissivity becomes greater.

When the interparticle distance of the inorganic particles is great, areas where the inorganic particles are locally concentrated are present, with the other areas lacking the inorganic particles being present. In this case, the area becomes small. Consequently, the emissivity is lowered.

That is, in the case where the ratio of the inorganic particles contained in the surface coating layer is constant, as the interparticle distance of the inorganic particles becomes smaller, the area becomes larger.

In the case where the inorganic particles have an average interparticle distance of is about 3 μm or less, since the interparticle distance of the inorganic particles is not too large, it becomes easier to provide an exhaust pipe 1 having a desired heat releasing characteristic.

However, the inorganic particles in the surface coating layer may have an average interparticle distance of exceeding 3 μm.

The inorganic particles in the surface coating layer have an average interparticle distance of desirably about 0.1 μm or more. When the average of the interparticle distance is about 0.1 μm or more, thermal stress does not become great in areas among the particles at the time of heating as well as at the time of cooling. Thus, a crack in an inorganic glass material tends not to occur. When a crack occurs in the inorganic glass material, there may be possibilities of a crack in the surface coating layer and drop off thereof that occur from the crack as a starting point, failing to provide an exhaust pipe having high emissivity.

The above description has discussed the method for producing an exhaust pipe in accordance with the present embodiment.

The following description will list the functions and effects of the method for producing an exhaust pipe in accordance with the present embodiment.

(1) In the method for producing an exhaust pipe in the present embodiment, in the coatfilm forming step, a coat film is formed on a surface of a metal base material by carrying out an electrocoating process using a paint containing an electrocoating resin. Thereafter, in the heating step, the coat film is heated to temperature that is not less than the burning-out temperature of the electrocoating resin, and the coat film is then further heated to temperature that is not less than the softening point of inorganic glass particles. As a result, a surface coating layer having concave portions formed on its surface tends to be formed. The reason why the surface coating layer having concave portions on the surface thereof is likely to be formed has already been described.

Moreover, in the heating step, since the coat film is heated to temperature that is not less than the softening point of the inorganic glass particles, the inorganic glass particles are fused. Therefore, it is considered that a reduction rate in film thickness of the coat film becomes great so that surface coating layers having concave portions are more easily formed.

In this manner, since the exhaust pipe produced through the above-mentioned steps tends to have concave portions formed on its surface coating layer, the surface area of the exhaust pipe tends to become great to allow the exhaust pipe to likely have high apparent emissivity. For this reason, by accelerating the radiant heat transfer, the resultant exhaust pipe is likely to be allowed to have a superior heat releasing characteristic.

Moreover, by the concave portions formed on the surface of the surface coating layer, it is easy to set many non-fixed ends for use in dispersing thermal stress. Furthermore, by the concave portions formed on the surface of the surface coating layer, portions having thinner film thicknesses are formed in the surface coating layer, and since a temperature difference in each of these portions becomes small in the thickness direction, thermal stress hardly occurs inside the surface coating layer. Therefore, the thermal stress due to thermal impact is likely to be alleviated so that the surface coating layer is likely to be prevented from having separation. It is considered that, as a result, the exhaust pipe obtained according to the embodiment of the present invention tends to maintain a high heat releasing characteristic.

In this manner, in accordance with the method for producing an exhaust pipe of the present embodiment, the concave portions is likely to be formed on the surface of the surface coating layer efficiently, thereby making it easier to obtain an exhaust pipe having a superior heat releasing characteristic.

Moreover, since the inorganic glass particles are fused and then sintered in the heating step, it becomes easier to improve adhesion between the surface coating layer and the metal base material. Consequently, the thermal impact resistant property of the exhaust pipe is likely to be improved.

(2) In the method for producing an exhaust pipe in accordance with the present embodiment, the heating step includes a degreasing step in which after the coatfilm forming step, the coat film is maintained at temperature that is not less than the burning-out temperature of the electrocoating resin for a predetermined period of time to burn out the electrocoating resin, and a firing step in which, after the degreasing step, the coat film is heated to temperature that is not less than the softening point of the inorganic glass particles.

By carrying out the degreasing step between the coatfilm forming step and the firing step, it is possible to suppress the production of large concave portions in the surface coating layer due to bumping caused by a rapid heating process, and consequently concave portions having appropriate sizes are likely to be formed. As a result, it becomes easier to obtain an exhaust pipe having a large surface area.

(3) In the method for producing an exhaust pipe in accordance with the present embodiment, the electrocoating resin is composed of a plurality of kinds of electrocoating resins each having mutually different $T_g$.

With this arrangement, it is considered to be possible to make the paint less vulnerable to influences from the temperature at the time of application thereof so that it becomes easier to carry out a stable coatfilm forming process, with a comparatively wide temperature range, and consequently the temperature dependence of the paint at the time of the application thereof is likely to be alleviated.

As a result, it is considered that an exhaust pipe having a surface coating layer with desired concave portions formed on the surface thereof is likely to be obtained.

(4) In the method for producing an exhaust pipe in accordance with the present embodiment, the electrocoating resin has a $T_g$ of from about 5° C. to about 50° C.

In the case where the $T_g$ of the electrocoating resin is not less than about 5° C., the viscosity as a coat film is not low, and the resin tends not to easily flow. Consequently, during the electrocoating process, when paths are once formed on the coat film, the peripheral electrocoating resin is less likely to be softened and is less likely to flow. Thus, the paths are less likely to be filled with the coat film. On the contrary, when the $T_g$ of the electrocoating resin is not more than about 50° C., the electrocoating resin is not too hard at room temperature and is less likely to hardly flow. As a result, desired paths are likely to be formed on the coat film.

In contrast, in accordance with the method for producing an exhaust pipe of the present embodiment, since the $T_g$ of the electrocoating resin falls within the above-mentioned range, the flowability of the electrocoating resin is appropriately adjusted. With this arrangement, it is considered that paths are likely to be formed during the electrocoating process, with the result that it becomes easier to obtain an exhaust pipe in which desired concave portions are formed on the surface of the surface coating layer.

(5) In the method for producing an exhaust pipe in accordance with the present embodiment, the electrocoating resin is an anionic electrocoating resin.

In order to make it easier to form desired concave portions on the surface of the exhaust pipe, it is necessary to improve the stability of the paint, and also to suppress the precipitation of the particles. In the case where the stability of the paint is low and particles are remarkably precipitated, since a large amount of particles drop on the horizontal surface portion of the metal base material, desired concave portions are not easily formed.

In the method for producing an exhaust pipe of the present embodiment, since an anionic electrocoating resin is used as the electrocoating resin, good compatibility is provided between the surface charge of the inorganic particles and the surface charge of the inorganic glass particles so that the anionic electrocoating resin functions to suppress the precipitation of the inorganic particles and the inorganic glass particles, and therefore the stability of the paint is likely to be improved; thus, it becomes easier to preferably form the coat film.

As a result, it is considered that it becomes easier to obtain an exhaust pipe having desired concave portions formed on the surface of the surface coating layer.

(6) In the method for producing an exhaust pipe in accordance with the present embodiment, the paint further includes inorganic particles.

Since the inorganic particles have high emissivity in their material physical properties, infrared rays are released strongly when heated. This is indicated by Stefan-Boltzmann law represented by the following expression (4):

$$q=\epsilon\sigma(T_1^4-T_2^4) \quad (4)$$

($\sigma$: Stefan-Boltzmann constant . . . $5.67\times10^{-8}$ [$W/m^2\cdot K^4$], q: heat flux [$W/m^2$], $\epsilon$: emissivity, $T_1$: heating unit temperature [K], $T_2$: heat receiving unit temperature [K])

Therefore, it is considered that an exhaust pipe obtained by applying a paint containing inorganic particles thereto generates infrared rays emitted from the inorganic particles in the surface coating layer, and the emissivity of the surface coating layer becomes high so that an exhaust pipe having a superior heat releasing characteristic at high temperature tends to be obtained.

Moreover, it is considered that since the flowability of the inorganic glass particles softened at the time of firing is lowered so that flowing of the coat film on the periphery of the concave portions tends to be suppressed, it becomes possible to easily form the concave portions on the surface of the surface coating layer.

As described above, it is considered that an exhaust pipe that is further superior in heat releasing characteristic is likely to be obtained.

(7) In the method for producing an exhaust pipe in accordance with the present embodiment, the inorganic glass particles have an average particle diameter of about 3 μm or less, and the inorganic particles have an average particle diameter of about 3 μm or less.

In the case where the average particle diameters of the inorganic glass particles and inorganic particles are small, since large particles are less likely to be contained, the sizes of the particles tend not to become ununiform. In this case, since the flow of the coat film is less likely to be locally disturbed during the electrocoating process, paths are likely to be formed, with the result that concave portions are likely to be formed on the surface of the exhaust pipe.

In contrast, in accordance with the method for producing an exhaust pipe of the present embodiment, since the inorganic glass particles and the inorganic particles are small, the distribution of the inorganic glass particles and the inorganic particles are likely to be uniform. As a result, it is considered to be possible to easily form concave portions on the surface of the exhaust pipe.

Moreover, it is considered that in the case where the inorganic glass particles are small, since, upon firing, the concave portions on the surface of the exhaust pipe are not likely to be filled with the softened inorganic glass particles so that concave portions are not likely to be hardly formed favorably on the surface of the exhaust pipe.

On the other hand, in the case where the inorganic particles are small as well, upon firing, solid-state inorganic particles are dispersed in the softened inorganic glass particles in a liquid state. At this time, it is considered that in the case where the inorganic particles are small, composite particles between the softened inorganic glass particles and the inorganic particles have high viscosity and low flowability in comparison with the case where the inorganic particles are large so that the composite particles are less likely to fill in the concave portions on the surface of the exhaust pipe.

Moreover, it is considered that, since the average particle diameters of the inorganic glass particles and inorganic particles are small, upon carrying out the electrocoating process, the inorganic glass particles and the inorganic particles are likely to be stabilized in a solution of the paint.

Particles in a paint solution are allowed to exist stably, when their particle diameters are small. This is indicated by Stokes' formula (5) shown below.

$$Vs=Dp^2(\rho p-\rho f)g/18\eta \quad (5)$$

(Vs: terminal rate of particle [m/s], Dp: particle diameter [m], ρp: density of particles [kg/$m^3$], ρf: density of fluid [kg/$m^3$], g: gravitational acceleration [m/$s^2$], η: viscosity of fluid [Pa·s]), Therefore, by using particles having a small particle diameter as the inorganic glass particles and the inorganic particles, the precipitation rate in a paint solution is likely to be made small upon electrocoating, thereby making it easier to stabilize the inorganic glass particles and the inorganic particles in the paint solution.

It is considered that based upon the above reasons, an exhaust pipe having desirable concave portions formed on the surface of the surface coating layer is likely to be obtained.

(8) In the method for producing an exhaust pipe in accordance with the present embodiment, the electrocoating resin has a weight ratio of from about 1.0 to about 3.5 based on the total weight of the inorganic particles and the inorganic glass particles.

When the amount of the electrocoating resin contained in the paint is not too large, the volume ratios of the inorganic particles and inorganic glass particles do not become too low, and the inorganic particles and the inorganic glass particles are less likely to be separated from one another within the coat film. Consequently, the inorganic particles and the inorganic glass particles are likely to be combined with each other; therefore, upon degreasing the electrocoating resin, even when the electrocoating resin is heated and burned out, the inorganic particles and the inorganic glass particles tend not to collapse and easily drop off.

Additionally, the degreasing refers to a process for burning the electrocoating resin out by carrying out a heating process.

On the contrary, in the case where the amount of the electrocoating resin contained in the paint is not too small, the densities of the inorganic particles and inorganic glass particles contained in the paint tend not to become too high, and the ratio of solid-state components (particles) in the coat film deposited by the electrocoating process also tends not to become too high. Consequently, since the flowability of the coat film during application of the electrocoating current is good, the path formation and coat film formation on the periphery of the paths tends to progress. As a result, desired concave portions are also likely to be formed on the surface of the exhaust pipe. Moreover, when the amounts of the inorganic particles and inorganic glass particles contained in the paint are not too large, the precipitation of the inorganic particles and the inorganic glass particles tend not to easily occur, and the particle concentration in the coating solution tends not to change to hardly cause fluctuations in the coating conditions. As a result, it becomes easier to form the coat film in a stable manner. Moreover, the sedimentation of the particles onto the bottom surface of the electrocoating vessel tends not to cause another problem.

When the electrocoating resin has a weight ratio of from about 1.0 to about 3.5 based on the total weight of the inorganic particles and the inorganic glass particles, it becomes possible to form a desired surface coating layer on the surface of the exhaust pipe without causing these problems.

EXAMPLES

The following description will discuss the present invention in detail by means of examples; however, the present invention is not limited to these examples.

Example 1

(1) Production of a Paint

As a powder for inorganic particles, a powder of a metal oxide composed of $MnO_2$ powder (24 parts by weight), FeO powder (8 parts by weight), CuO powder (4 parts by weight) and CoO powder (4 parts by weight) was prepared. The inorganic particles had an average particle diameter of 0.8 μm.

Moreover, as a powder for inorganic glass particles, K807 (60 parts by weight) ($SiO_2$—BaO—$B_2O_2$ glass powder, softening point: 720° C.), manufactured by Asahi Glass Co., Ltd., was prepared. The inorganic glass particles had an average particle diameter of 0.9 μm.

The powder of the inorganic particles and the powder of the inorganic glass particles were dry-mixed to produce a mixed powder.

Moreover, to a reaction container were added a monomer composition, a solvent and a polymerization initiator, and the monomer composition was polymerized so that an anionic electrocoating resin was produced. More specifically, as the monomer composition, ethyl acrylate (13 parts by weight), 2-ethylhexyl methacrylate (30 parts by weight), methyl methacrylate (31 parts by weight), acrylic acid (9 parts by weight), 2-hydroxyethyl acrylate (17 parts by weight) and N-methylol methacryl amide (4 parts by weight) were added. Moreover, as the solvent, isopropyl alcohol (IPA) (54 parts by weight) and butyl cellosolve (15 parts by weight) were added thereto. Moreover, as the polymerization initiator, azobis isobutylonitrile (3 parts by weight) was added thereto.

To the mixed powder, the anionic electrocoating resin (170 parts by weight), obtained by the polymerization, was added and mixed as an organic binder.

Thereafter, to this were further added pure water (1500 parts by weight) and other various additives and mixed so that a paint was produced.

The solid-component concentration of the paint thus produced was 15% by weight.

By using a DSC (differential scanning calorimeter) (EXSTAR DSC6220, manufactured by SII-Nanotechnology Inc.), $T_g$ of the anionic electrocoating resin was measured to find that the $T_g$ was 25° C.

(2) Preparation of Metal Base Material

As a metal base material, a plate-shaped stainless base material (made of SUS430) having a width of 100 mm, a length of 100 mm and a thickness of 2 mm was prepared. This metal base material was subjected to ultrasonic washing in an alcohol solvent, and subsequently subjected to a sandblasting process so as to roughen the surface of the metal base material. The sandblasting process was carried out using $Al_2O_3$ abrasive grains of #100 for 10 minutes.

By using a surface-roughness measuring machine (HANDY SURF E-35B, manufactured by Tokyo Seimitsu Co., Ltd.), the surface roughness of the metal base material was measured to find that the surface roughness $Rz_{JIS}$ was 8.8 μm.

(3) Formation of a Coat Film

The paint (0.7 g) prepared in the step (1) was uniformly applied to the surface of the metal base material obtained in the step (2) by an electrocoating process. More specifically, the metal material and an electrode plate were placed in the paint, and by allowing the metal base material to function as an anode, with the electrode plate allowing to function as a cathode, and a voltage was applied.

The electrocoating process was carried out under conditions of a voltage of 100 V, a bath temperature of 26 to 32° C. and 3 minutes in a current-applying time, while the paint was kept in a stirring state using a rotary stirrer. The solid-component concentration of the paint was 15% by weight, and the pH thereof was in a range from 8.0 to 9.5.

(4) Drying and Curing

The metal base material coated with the paint by the step (3) was heated at 160° C. for 60 minutes in a drying machine so that the coat film of the paint formed on the surface of the metal base material was dried and cured.

(5) Degreasing

After the step (4), the metal base material was heated in a heating furnace at 400° C. for 60 minutes so that the electrocoating resin contained in the coat film was burned out.

The temperature rising rate from the heating temperature (160° C.) in the step (4) Drying and curing to the heating temperature (400° C.) in the present step was 4.0° C./minute.

(6) Firing

After the step (5), the metal base material was heated in a heating furnace at 850° C. for 20 minutes so that the coat film was subjected to a firing treatment.

The temperature rising rate from the heating temperature (400° C.) in the step (5) Degreasing to the heating temperature (850° C.) in the present step was 9.0° C./minute.

By carrying out the above-mentioned steps, baked samples of the paint in which surface coating layers are formed on the metal base materials were produced.

Example 2

Baked samples of the paint were produced in the same steps as in Example 1, except that in the step of (1) Production of a paint of Example 1, the amount of the powder of inorganic particles blended was 0 part by weight and the paint contained no inorganic particles, and that the amount of the powder of inorganic glass particles blended was 100 parts by weight.

Example 3

Baked samples of the paint were produced in the same steps as in Example 1, except that the temperature rising rate was accelerated.

The temperature rising rate from the heating temperature (160° C.) in the step (4) Drying and curing to the heating temperature (400° C.) in the step (5) Degreasing was 15.0° C./minute.

The temperature rising rate from the heating temperature (400° C.) in the step (5) Degreasing to the heating temperature (850° C.) in the step (6) Firing was 25.0° C./minute.

Example 4

Baked samples of the paint were produced in the same steps as in Example 1, except that the temperature rising rate was accelerated.

The temperature rising rate from the heating temperature (160° C.) in the step (4) Drying and curing to the heating temperature (400° C.) in the step (5) Degreasing was 10.0° C./minute.

The temperature rising rate from the heating temperature (400° C.) in the step (5) Degreasing to the heating temperature (850° C.) in the step (6) Firing was 15.0° C./minute.

Example 5

Baked samples of the paint were produced in the same steps as in Example 1, except that the temperature rising rate was delayed.

The temperature rising rate from the heating temperature (160° C.) in the step (4) Drying and curing to the heating temperature (400° C.) in the step (5) Degreasing was 2.0° C./minute.

The temperature rising rate from the heating temperature (400° C.) in the step (5) Degreasing to the heating temperature (850° C.) in the step (6) Firing was 4.0° C./minute.

Example 6

Baked samples of the paint were produced in the same steps as in Example 1, except that in the step of (1) Production of a paint of example 1, two kinds of anionic electrocoating resins having mutually different $T_g$'s (one has a $T_g$ of 5° C. and the other has a $T_g$ of 50° C.) were used. The amounts of the two kinds of anionic electrocoating resins blended were 85 parts by weight, respectively.

The anionic electrocoating resin ($T_g$: 5° C.) was produced by adding a monomer composition, a solvent and a polymerization initiator to a reaction container and polymerizing the monomer composition. More specifically, as the monomer composition, ethyl acrylate (28 parts by weight), 2-ethylhexyl methacrylate (32 parts by weight), methyl methacrylate (14 parts by weight), acrylic acid (9 parts by weight), 2-hydroxyethylacrylate (17 parts by weight) and N-methylol methacryl amide (4 parts by weight) were added. Moreover, as the solvent, isopropyl alcohol (IPA) (54 parts by weight) and butyl cellosolve (15 parts by weight) were added thereto. Furthermore, as the polymerization initiator, azobis isobutylonitrile (3 parts by weight) was added thereto.

The anionic electrocoating resin ($T_g$: 50° C.) was prepared by adding a monomer composition, a solvent and a polymerization initiator to a reaction container and polymerizing the monomer composition. More specifically, as the monomer composition, ethyl acrylate (4 parts by weight), 2-ethylhexyl methacrylate (20 parts by weight), methyl methacrylate (50 parts by weight), acrylic acid (9 parts by weight), 2-hydroxyethylacrylate (17 parts by weight) and N-methylol methacryl amide (4 parts by weight) were added. Moreover, as the solvent, isopropyl alcohol (IPA) (54 parts by weight) and butyl cellosolve (15 parts by weight) were added thereto. Furthermore, as the polymerization initiator, azobis isobutylonitrile (3 parts by weight) was added thereto.

Example 7

Baked samples of the paint were produced in the same steps as in Example 1, except that in the step of (1) Production of a paint of example 1, inorganic particles having an average particle diameter of 3.8 μm and inorganic glass particles having an average particle diameter of 4.3 μm were used.

Example 8

Baked samples of the paint were produced in the same steps as in Example 1, except that the step (6) Firing was carried out without carrying out the step (5) Degreasing of Example 1.

The temperature rising rate from the heating temperature (160° C.) in the step (4) Drying and curing to the heating temperature (850° C.) in the step (6) Firing was 9.0° C./minute.

Comparative Example 1

Baked samples of the paint were produced in the same steps as in Example 1, except that in the step of (1) Production of a paint of example 1, in place of the anionic electrocoating resin, methylcellulose (methylcellulose 25, manufactured by Kishida Chemical Co., Ltd.) was used as an organic binder, as well as using inorganic particles having an average particle diameter of 3.8 μm and inorganic glass particles having an average particle diameter of 4.3 μm, that in the step (3) Formation of a coat, the paint was coated by a spray coating method (atomization coating) in place of the electrocoating process, and that the step (6) Firing was carried out without carrying out the step (5) Degreasing.

The temperature rising rate from the heating temperature (160° C.) in the step (4) Drying and curing to the heating temperature (850° C.) in the step (6) Firing 9.0° C./minute.

Thereafter, by using a cutter, cuts were formed on each of the baked samples of the paint in two longitudinal and lateral directions in a diced pattern with a density of 30 lines/cm so that concave portions were formed on the based sample of the paint.

Comparative Example 2

Baked samples of the paint were produced in the same steps as in Comparative Example 1; however, no concave portions were formed on each of the baked samples of the paint by forming cuts on each of the baked samples of the paint in two longitudinal and lateral directions in a diced pattern by the use of a cutter. Here, the baked sample of Comparative Example 2 corresponds to the conventional art (for example, the techniques described in JP 2009-133213 A and JP 2009-133214 A).

Comparative Example 3

Baked samples of the paint were produced in the same steps as in Comparative Example 1, except that in the step of (1) Production of a paint of Comparative Example 1, the amount of the powder of inorganic particles blended was 0 part by weight and the paint contained no inorganic particles, and that the amount of the powder of inorganic glass particles blended was 100 parts by weight.

Comparative Example 4

Samples were produced in the same steps as in Example 1, except that the step (6) Firing of Example 1 was not carried out.

The following evaluations were carried out on each of the baked samples of the paint of Examples 1 to 8 and Comparative Examples 1 to 4.

(Evaluation of Emissivity)

The emissivity of each of the baked samples of the paint of Examples 1 to 8 and Comparative Examples 1 to 4 was measured by using an emissivity meter D&S AERD manufactured by KEM, and the results thereof are shown in Tables 1A to 1C.

Evaluation results of the emissivity in Tables 1A to 1C were given based on 5 ranks of "++", "+", "±", "−" and "−−". In this case, "−" indicates that there were no changes in emissivity in comparison with that of Comparative Example 2 (conventional art). "±" indicates that the emissivity was slightly improved (0.01) in comparison with that of Comparative Example 2 (conventional art). "+" indicates that the emissivity was comparatively (0.02 to 0.05) improved in comparison with that of Comparative Example 2 (conventional art). "++" indicates that the emissivity was remarkably (0.06 or more) improved in comparison with that of Comparative Example 2 (conventional art). "−−" indicates that the emissivity became worse in comparison with that of Comparative Example 2 (conventional art).

The results of evaluations of emissivity show that Example 1 corresponds to "++", Examples 2, 4 and 6, as well as Comparative Example 1 correspond to "+", Examples 3, 5 and 7 correspond to "±", Example 8 as well as Comparative Examples 2 and 4 correspond to "−", and Comparative Example 3 corresponds to "−−".

(Evaluation of Heat Impact Resistance)

Each of the baked samples of the paint of Examples 1 to 8 and Comparative Examples 1 to 4 was heated in a heating furnace at 850° C. for 10 minutes, and the resultant sample, as it was, was put into water at 25° C. without a cooling period of time, and visually observed as to whether or not any drop off or crack occurred in the surface coating layer (baked coated portion of the paint), and the results thereof are shown in Tables 1A to 1C.

Evaluation results of the heat impact resistance in Tables 1A to 1C are given based on 3 ranks of "+", "±" and "−−". In this case, "+" indicates that there were neither drop off nor cracks. "±" indicates that although there was no drop off, cracks occurred. Moreover, "−−" indicates that cracks as well as drop off occurred. Between drop off and cracks, since the drop off causes more damages to the surface coating layer than the cracks, the occurrence of drop off is determined as "−−".

The results of evaluations of heat impact resistance show that examples 1 to 8 correspond to "+", comparative examples 1 and 2 correspond to "±", and comparative examples 3 and 4 correspond to "−−".

(General Determination)

Based on the evaluations of emissivity and heat impact resistance, general determinations as shown in Tables 1A to 1C were given to the results of Examples 1 to 8 as well as Comparative Examples 1 to 4.

General determinations are given based on 4 ranks of "++", "+", "±" and "−−". In the case where those having "++" in the evaluation of emissivity also have "+" in the evaluation of heat impact resistance, this case is determined as "++", in the case where those having "+", "±", or "−" in the evaluation of emissivity have "+" in the evaluation of heat impact resistance, this case is determined as "+", in the case where those having "+" in the evaluation of emissivity have "±" in the evaluation of heat impact resistance, this case is determined as "±", and in the case where those having "±", "−" or "−−" in the evaluation of emissivity have "±" or "−−" in the evaluation of heat impact resistance, this case is determined as "−−".

Here, "++" is the best evaluation, "+" is a better evaluation next to "++", "±" is a better evaluation next to "+", and "−−" is the worst evaluation.

TABLE 1A

| | Paint | | | | | | | |
|---|---|---|---|---|---|---|---|---|
| | Inorganic glass particle | | Inorganic particle | | | Organic binder | | |
| | Kind | Average particle diameter [μm] | Kind | Blending ratio | Average particle diameter [μm] | Kind | | Tg [° c.] |
| Example 1 | $SiO_2$—BaO—$B_2O_3$ | 0.9 | $MnO_2$—FeO—CuO—CoO | 6:2:1:1 | 0.8 | Electrocoating resin | Anionic | 25 |
| Example 2 | $SiO_2$—BaO—$B_2O_3$ | 0.9 | — | — | — | Electrocoating resin | Anionic | 25 |
| Example 3 | $SiO_2$—BaO—$B_2O_3$ | 0.9 | $MnO_2$—FeO—CuO—CoO | 6:2:1:1 | 0.8 | Electrocoating resin | Anionic | 25 |
| Example 4 | $SiO_2$—BaO—$B_2O_3$ | 0.9 | $MnO_2$—FeO—CuO—CoO | 6:2:1:1 | 0.8 | Electrocoating resin | Anionic | 25 |
| Example 5 | $SiO_2$—BaO—$B_2O_3$ | 0.9 | $MnO_2$—FeO—CuO—CoO | 6:2:1:1 | 0.8 | Electrocoating resin | Anionic | 25 |
| Example 6 | $SiO_2$—BaO—$B_2O_3$ | 0.9 | $MnO_2$—FeO—CuO—CoO | 6:2:1:1 | 0.8 | Electrocoating resin | Anionic | 5, 50 |
| Example 7 | $SiO_2$—BaO—$B_2O_3$ | 4.3 | $MnO_2$—FeO—CuO—CoO | 6:2:1:1 | 3.8 | Electrocoating resin | Anionic | 25 |
| Example 8 | $SiO_2$—BaO—$B_2O_3$ | 0.9 | $MnO_2$—FeO—CuO—CoO | 6:2:1:1 | 0.8 | Electrocoating resin | Anionic | 25 |
| Comparative Example 1 | $SiO_2$—BaO—$B_2O_3$ | 4.3 | $MnO_2$—FeO—CuO—CoO | 6:2:1:1 | 3.8 | Methylcellulose | — | — |
| Comparative Example 2 | $SiO_2$—BaO—$B_2O_3$ | 4.3 | $MnO_2$—FeO—CuO—CoO | 6:2:1:1 | 3.8 | Methylcellulose | — | — |
| Comparative Example 3 | $SiO_2$—BaO—$B_2O_3$ | 4.3 | — | — | — | Methylcellulose | — | — |
| Comparative Example 4 | $SiO_2$—BaO—$B_2O_3$ | 0.9 | $MnO_2$—FeO—CuO—CoO | 6:2:1:1 | 0.8 | Electrocoating resin | Anionic | 25 |

TABLE 1B

| | Step | | | |
|---|---|---|---|---|
| | Degreasing (400° C.) | Temperature rising rate ~400° C. [° C./min] | Firing (850° C.) | Temperature rising rate ~850° C. [° C./min] |
| Example 1 | Conducted | 4 | Conducted | 9 |
| Example 2 | Conducted | 4 | Conducted | 9 |
| Example 3 | Conducted | 15 | Conducted | 25 |
| Example 4 | Conducted | 10 | Conducted | 15 |
| Example 5 | Conducted | 2 | Conducted | 4 |
| Example 6 | Conducted | 4 | Conducted | 9 |
| Example 7 | Conducted | 4 | Conducted | 9 |
| Example 8 | Not conducted | — | Conducted | 9 |
| Comparative Example 1 | Not conducted | — | Conducted | 9 |
| Comparative Example 2 | Not conducted | — | Conducted | 9 |
| Comparative Example 3 | Not conducted | — | Conducted | 9 |
| Comparative Example 4 | Conducted | 4 | Not conducted | — |

TABLE 1C

| | Evaluation result | | | |
|---|---|---|---|---|
| | Emissivity | | Heat impact | |
| | Measured value | Evaluation | resistance Evaluation | General determination |
| Example 1 | 0.87 | ++ | + | ++ |
| Example 2 | 0.84 | + | + | + |
| Example 3 | 0.82 | ± | + | + |
| Example 4 | 0.85 | + | + | + |
| Example 5 | 0.82 | ± | + | + |
| Example 6 | 0.84 | + | + | + |
| Example 7 | 0.82 | ± | + | + |
| Example 8 | 0.81 | − | + | + |
| Comparative Example 1 | 0.83 | + | ± | ± |
| Comparative Example 2 | 0.81 | − | ± | −− |
| Comparative Example 3 | 0.80 | −− | −− | −− |
| Comparative Example 4 | 0.81 | − | −− | −− |

The film thickness (distance D in FIG. 5) of the surface coating layer, the diameter of the concave portion, the density of the concave portions, and the film thickness of the concave portion (see distance d in FIG. 5) were measured, as well as observing the presence or absence of the concave portion and the shape thereof, and the results thereof are shown in Table 2. The film thickness of the surface coating layer was obtained by measuring the cross section of each test piece by SEM. The diameter of the concave portion was obtained by measuring the surface of each test piece by SEM. The density of the concave portions was obtained by measuring the surface of each test piece by SEM. The film thickness of the concave portion was obtained by measuring the cross sectional face of each test piece by SEM.

The shape of the concave portion refers to a shape viewed in the direction perpendicular to the surface of the base material. In the case where the corresponding shape is a virtually round shape, the longest length obtained when a straight line is drawn within the virtually round shape is defined as a diameter of the concave portion, while in the case where the corresponding shape is a straight line, the width of the straight line is defined as a diameter of the concave portion.

In Table 2, "through hole is present" refers to the fact that "the concave portion penetrates the surface coating layer", that is, the film thickness of the concave portion d=0, and "no through hole is present" refers to the fact that "the concave portion does not penetrate the surface coating layer", that is, the film thickness of the concave portion d>0.

TABLE 2

| | Film thickness of surface coating layer [μm] | Presence or absence of concave portion | Shape of concave portion | Diameter of concave portion [μm] | Density of concave portion [pieces/cm$^2$] | Film thickness of concave portion [μm] |
|---|---|---|---|---|---|---|
| Example 1 | 6.2 | Present | Round | 102 | About $10^3$ | 3.1 (no through hole is present) |
| Example 2 | 5.6 | Present | Round | 93 | About $10^3$ | 2.8 (no through hole is present) |
| Example 3 | 5.8 | Present | Round | 960 | About $10^3$ | 0.0 (through hole is present) |
| Example 4 | 6.3 | Present | Round | 800 | About $10^3$ | 2.0 (no through hole is present) |
| Example 5 | 6.5 | Present | Round | 104 | 10 | 2.4 (no through hole is present) |
| Example 6 | 5.8 | Present | Round | 91 | About $10^3$ | 2.3 (no through hole is present) |
| Example 7 | 5.8 | Present | Round | 112 | About $10^3$ | 2.8 (no through hole is present) |
| Example 8 | 6.2 | Present | Round | 2100 | 2 | 0.0 (through hole is present) |
| Comparative Example 1 | 6.1 | Present | Straight line | 510 | (About $10^3$) | 3.5 (no through hole is present) |
| Comparative Example 2 | 5.8 | Absent | — | — | — | — |
| Comparative Example 3 | 5.7 | Absent | — | — | — | — |
| Comparative Example 4 | — | — | — | — | — | — |

In the general determination, Examples 1 to 8 were highly evaluated in comparison with Comparative Examples 1 to 3.

This is presumably because an electrocoating resin was used as the inorganic binder in Examples 1 to 8, while methyl cellulose was used as the inorganic binder in Comparative Examples 1 to 3.

That is, as described in the functions and effects (1) of the method for producing an exhaust pipe of the present embodiment, it is considered that this effect was obtained in Examples 1 to 8, because by using the electrocoating resin, concave portions were formed in the surface coating layer.

Moreover, in the general determination, Examples 1 to 8 were highly evaluated in comparison with Comparative Example 4.

This is presumably because the firing step was carried out in Examples 1 to 8, while no firing step was carried out in Comparative Example 4.

That is, as described in the functions and effects (1) of the method for producing an exhaust pipe of the present embodiment, it is considered that this effect was obtained in Examples 1 to 8, because by fusing and sintering the inorganic glass particles in the heating step, the adhesion between the surface coating layer and the metal base material was improved.

Moreover, in the evaluation of emissivity, Examples 1 to 7 were highly evaluated in comparison with Example 8.

This is presumably because the degreasing step was carried out in Examples 1 to 7, while no degreasing step was carried out in Example 8.

That is, as described in the functions and effects (2) of the method for producing an exhaust pipe of the present embodiment, it is considered that this effect was obtained in Examples 1 to 7, because by carrying out the degreasing step between the coat film forming step and the firing step, it was possible to suppress large concave portions to be generated due to bumping caused by rapid heating, and consequently concave portions having an appropriate size could be formed.

These results show that it is desirable to carry out the degreasing step.

However, in the general determination, Example 8 was evaluated more highly than Comparative Examples 1 to 4. That is, although no degreasing step was carried out in Example 8, desirable results were obtained in comparison with Comparative Examples 1 to 4, by carrying out the firing step, with the electrocoating resin being used. Based on these results, the present embodiment does not take the degreasing step as an essential constituent, as described earlier.

Moreover, with respect to the emissivity, Example 1 was 0.87 and Example 2 was 0.84; thus, Example 1 was evaluated more highly than Example 2.

This is presumably because Example 2 used a paint containing no inorganic particles, while Example 1 used a paint containing inorganic particles.

That is, as described in the functions and effects (6) of the method for producing an exhaust pipe of the present embodiment, it is considered that this effect was obtained in Example 1, because by using a paint containing inorganic particles, emission of infrared rays was generated from the inorganic particles in the surface coating layer, and because the flow of the coat film was suppressed on the periphery of each concave portion at the time of firing so that concave portions were easily formed on the surface of the surface coating layer.

Moreover, with respect to evaluation of the emissivity, the emissivity of Example 1 (emissivity: 0.87) was higher than those of Examples 3 to 5 (emissivities: 0.82, 0.85 and 0.82, respectively).

This is presumably because the temperature rising rates are respectively different from one another.

That is, it is considered that this effect was obtained in Example 1, because the temperature rising rate from the heating temperature (160° C.) in the step (4) Drying and curing to the heating temperature (400° C.) in the step (5) Degreasing, and the temperature rising rate from the heating temperature (400° C.) in the step (5) Degreasing to the heating temperature (850° C.) in the step (6) Firing were preferable rate (9.0° C./minute) in Example 1; however, those of Example 3 (25.0° C./minute) and Example 4 (15.0° C./minute) were faster than the rate of Example 1 (9.0° C./minute), while that of Example 5 (4.0° C./minute) was slower than the rate of Example 1 (9.0° C./minute).

Moreover, with respect to evaluation of the emissivity, the emissivity of Example 1 (emissivity: 0.87) was higher than that of Example 7 (emissivity: 0.82).

This is presumably because, while Example 7 used inorganic glass particles having a large average particle diameter of 4.3 μm and inorganic particles having a large average particle diameter of 3.8 μm, Example 1 used inorganic glass particles having a small average particle diameter of 0.9 μm and inorganic particles having a small average particle diameter of 0.8 μm.

That is, as described in the functions and effects (7) of the method for producing an exhaust pipe of the present embodiment, it is considered that this effect was obtained in Example 1, because by using the inorganic glass particles having a small average particle diameter and inorganic particles having a small average particle diameter in Example 1, it was possible to stabilize the inorganic glass particles and inorganic particles in a paint solution, with the result that desirable concave portions were formed on the surface of the surface coating layer.

Other Embodiments

As described in the embodiments earlier, the shape of the metal base material is desirably formed into a substantially cylindrical shape. However, the shape of the metal base material is not limited to the substantially cylindrical shape, and may be formed into a substantially flat plate shape or a substantially semi-cylindrical shape, and its outer peripheral shape of the cross section may be a substantially round shape, or may be other shapes, such as a substantially elliptical shape and a polygonal shape.

The surface of the metal base material to be coated with a paint is not necessarily limited to the entire outer circumferential surface of the metal base material, and may be one portion of the outer circumferential surface of the metal base material.

However, in the case where only one portion on the outer circumferential surface of the metal base material is coated with the paint, the area of the portion to be coated with the paint is desirably about 10% or more, more desirably about 50% or more, and furthermore desirably about 80% or more of the entire area of the outer circumferential surface of the metal base material. In the case where the area of the portion to be coated with the paint is about 10% or more of the entire area of the outer circumferential surface of the metal base material, the coated area of the paint is not too small, and thus the temperature rise of the inside of the exhaust pipe is likely to be efficiently suppressed.

In the case of using a metal base material having a substantially cylindrical shape, the surface to be coated with the paint may be not the outer circumferential surface, but the inner circumferential surface of the metal base material. In this case, the outer circumferential surface of the metal base material refers to a surface having a larger area of surfaces of the metal base material, and the inner circumferential surface of the metal base material refers to a surface having a smaller area thereof.

Moreover, the surface to be coated with a paint may be both surfaces of the metal base material.

The method for producing an exhaust pipe of the embodiment of the present invention includes essential constituents that after carrying out an electrocoating process by using a paint containing inorganic glass particles and an electrocoating resin, a coat film is heated to temperature that is not less than the burning-out temperature of the electrocoating resin, and that the coat film is further heated to temperature that is not less than the softening point of the inorganic glass particles.

By combining these essential constituents with various constitutions described in the embodiments in detail (such as kinds of inorganic glass particles, kinds of inorganic particles and the like) appropriately, it becomes possible to obtain desired effects.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing an exhaust pipe, comprising:

electrocoating a surface of a metal base material with a paint to form a coat film, the paint including inorganic glass particles and an electrocoating resin;

heating the coat film to a first temperature that is not lower than a burning-out temperature of the electrocoating resin; and heating the coat film, after heating the coat film to the first temperature, to a second temperature that is not lower than a softening point of the inorganic glass particles to produce the exhaust pipe which includes the metal base material and a surface coating layer formed on the surface of the metal base material.

2. The method according to claim 1, wherein the coat film is maintained at the first temperature for a predetermined period of time to burn out the electrocoating resin and to degrease the coat film, and the coat film is heated to the second temperature to fire the coat film after the coat film is maintained at the first temperature.

3. The method according to claim 2, wherein a temperature rising rate from the first temperature to the second temperature is from about 3.3° C./minute to about 100.0° C./minute.

4. The method according to claim 1, wherein the second temperature is in a range from about 500° C. to about 1000° C.

5. The method according to claim 1, wherein the first temperature is in a range from about 300° C. to about 600° C.

6. The method according to claim 1, wherein the electrocoating resin comprises a plurality of kinds of resins each having mutually different glass transition point ($T_g$).

7. The method according to claim 1, wherein the electrocoating resin has a $T_g$ of from about 5° C. to about 50° C.

8. The method according to claim 1, wherein the electrocoating resin is an anionic electrocoating resin.

9. The method according to claim 1, wherein the paint further includes inorganic particles.

10. The method according to claim 9, wherein the inorganic particles have an average particle diameter of about 3 μm or less and the inorganic glass particles have an average particle diameter of about 3 μm or less.

11. The method according to claim 9, wherein the electrocoating resin has a weight ratio of from about 1.0 to about 3.5 based on a total weight of the inorganic particles and the inorganic glass particles.

12. The method according to claim 9, wherein the inorganic particles in the surface coating layer have an average interparticle distance of about 3 μm or less.

13. The method according to claim 9, wherein the inorganic particles include an oxide of a transition metal.

14. The method for according to claim 1, wherein the inorganic glass particles have an average particle diameter of about 3 μm or less.

15. The method according to claim 1, wherein the electrocoating resin has a weight ratio of from about 1.0 to about 3.5 based on a weight of the inorganic glass particles.

16. The method according to claim 1, wherein the inorganic glass particles have the softening point of from about 300° C. to about 1000° C.

17. The method according to claim 1, wherein the coat film is maintained at a third temperature for a predetermined period of time to dry and cure the coat film, the coat film is maintained at the first temperature for a predetermined period of time to burn out the electrocoating resin and to degrease the coat film after the coat film is maintained at the third temperature, and the coat film is heated to the second temperature and maintained at the second temperature for a predetermined period of time to fire the coat film after the coat film is maintained at the first temperature.

18. The method according to claim 17, wherein a temperature rising rate from the third temperature to the first temperature is from about 1.7° C./minute to about 60.0° C./minute.

19. The method according to claim 17, wherein a temperature rising rate from the first temperature to the second temperature is from about 3.3° C./minute to about 100.0° C./minute.

* * * * *